United States Patent
Hsu et al.

(10) Patent No.: US 9,829,678 B2
(45) Date of Patent: Nov. 28, 2017

(54) OPTICAL IMAGING LENS AND ELECTRONIC DEVICE COMPRISING THE SAME

(71) Applicants: Sheng-Wei Hsu, Taichung (TW); Tzu-Chien Tang, Taichung (TW); Chih-Yang Yeh, Taichung (TW)

(72) Inventors: Sheng-Wei Hsu, Taichung (TW); Tzu-Chien Tang, Taichung (TW); Chih-Yang Yeh, Taichung (TW)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 111 days.

(21) Appl. No.: 14/309,904

(22) Filed: Jun. 20, 2014

(65) Prior Publication Data

US 2015/0253540 A1    Sep. 10, 2015

(30) Foreign Application Priority Data

Mar. 6, 2014  (TW) .............................. 103107733 A

(51) Int. Cl.
*G02B 13/18* (2006.01)
*G02B 9/62* (2006.01)
*G02B 13/00* (2006.01)
*H04N 101/00* (2006.01)

(52) U.S. Cl.
CPC ........... *G02B 9/62* (2013.01); *G02B 13/0015* (2013.01); *G02B 13/0045* (2013.01); *H04N 2101/00* (2013.01); *H04N 2209/042* (2013.01)

(58) Field of Classification Search
CPC . G02B 9/00; G02B 9/62; G02B 13/00; G02B 13/001; G02B 13/0015; G02B 13/002; G02B 13/0045; G02B 13/008
See application file for complete search history.

(56) References Cited

U.S. PATENT DOCUMENTS

| | | | |
|---|---|---|---|
| 7,663,814 B2 | 2/2010 | Kitahara | |
| 7,907,352 B2 | 3/2011 | Miyano | |
| 8,040,618 B2 | 10/2011 | Kitahara | |
| 8,379,323 B2 | 2/2013 | Huang et al. | |

(Continued)

FOREIGN PATENT DOCUMENTS

| | | |
|---|---|---|
| TW | 201239445 | 10/2012 |
| TW | 201239446 | 10/2012 |

(Continued)

*Primary Examiner* — Thong Nguyen
(74) *Attorney, Agent, or Firm* — Winston Hsu

(57) ABSTRACT

An optical imaging lens includes: a first, second, third, fourth, fifth and sixth lens element, the first lens element with positive refractive power, the second lens element having an object-side surface with a concave part in an outermost portion for an imaging rays passing through and an image-side surface with a concave part in an outermost portion for the imaging rays passing through, the fourth lens element having an image-side surface with a convex part in a vicinity of the optical axis, the fifth lens element having an object-side surface with a convex part in a vicinity of the optical axis and an image-side surface with a concave part in a vicinity of the optical axis, the sixth lens element having an image-side surface with a convex part in an outermost portion for the imaging rays passing through, and the sixth lens element being made of plastic.

18 Claims, 31 Drawing Sheets

(56) References Cited

U.S. PATENT DOCUMENTS

| | | | |
|---|---|---|---|
| 8,385,006 B2 | 2/2013 | Tsai et al. | |
| 8,749,896 B2 * | 6/2014 | Shinohara | G02B 13/18 |
| | | | 359/713 |
| 8,830,594 B1 * | 9/2014 | Hsu | G02B 9/62 |
| | | | 359/713 |
| 8,854,744 B2 * | 10/2014 | Liao | G02B 13/0045 |
| | | | 359/713 |
| 2010/0305405 A1 | 12/2010 | Miyano | |
| 2012/0170142 A1 | 7/2012 | Hsieh et al. | |
| 2012/0188654 A1 | 7/2012 | Huang | |
| 2012/0194726 A1 | 8/2012 | Huang et al. | |
| 2012/0243108 A1 * | 9/2012 | Tsai | G02B 13/18 |
| | | | 359/713 |
| 2012/0314304 A1 | 12/2012 | Huang | |
| 2013/0329306 A1 * | 12/2013 | Tsai | G02B 13/0045 |
| | | | 359/713 |
| 2013/0335833 A1 * | 12/2013 | Liao | G02B 13/0045 |
| | | | 359/713 |
| 2016/0004048 A1 * | 1/2016 | Noda | G02B 9/62 |
| | | | 359/713 |

FOREIGN PATENT DOCUMENTS

| | | |
|---|---|---|
| TW | 201243386 | 11/2012 |
| TW | 201300824 | 1/2013 |
| TW | 201305596 | 2/2013 |
| TW | 201312155 | 3/2013 |
| TW | 201317619 | 5/2013 |
| TW | 201331623 | 8/2013 |
| TW | 201337320 | 9/2013 |
| TW | 201344234 A | 11/2013 |
| TW | 201348789 | 12/2013 |

* cited by examiner

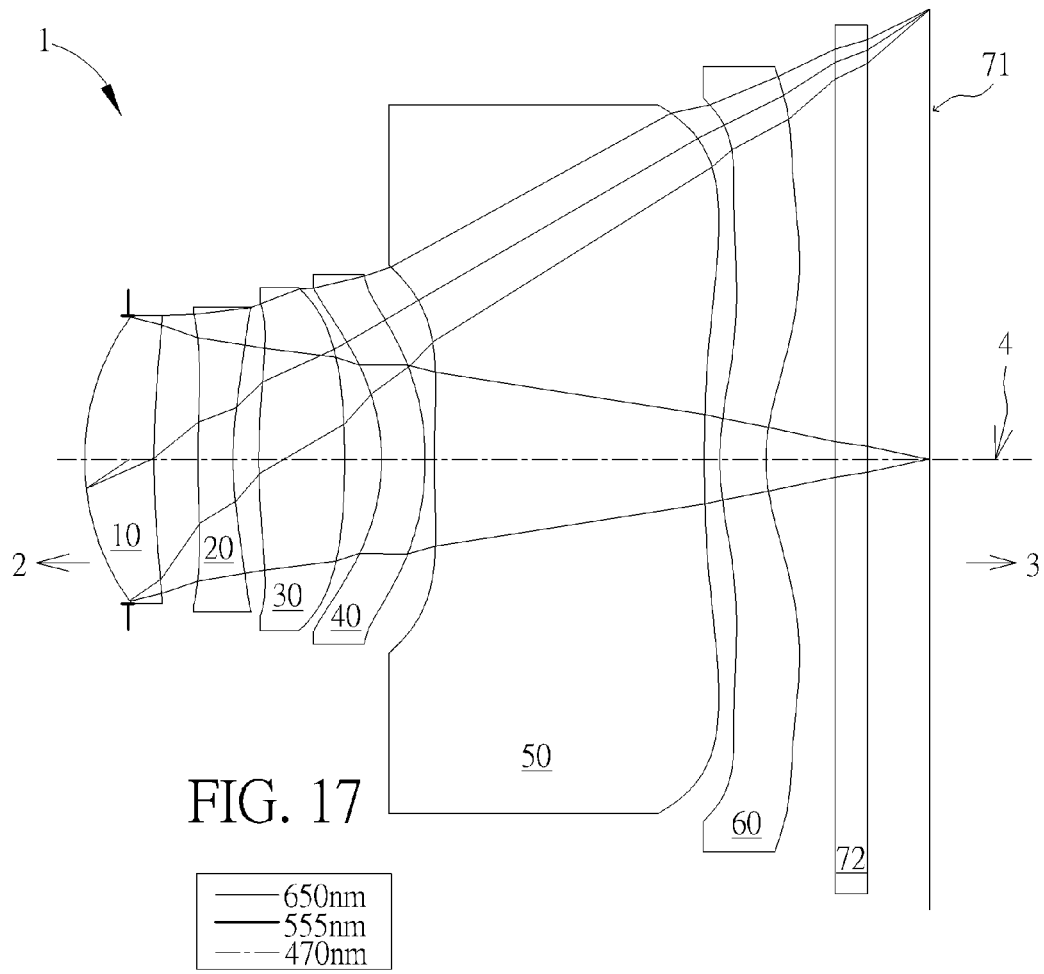
FIG. 17
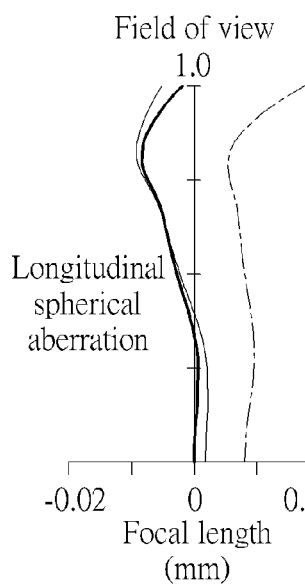 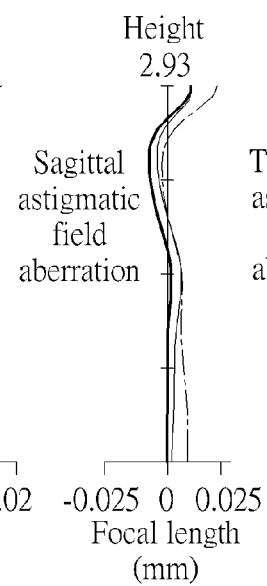 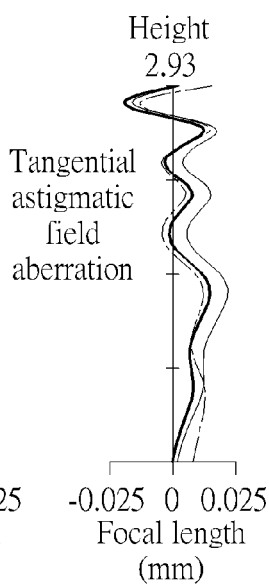 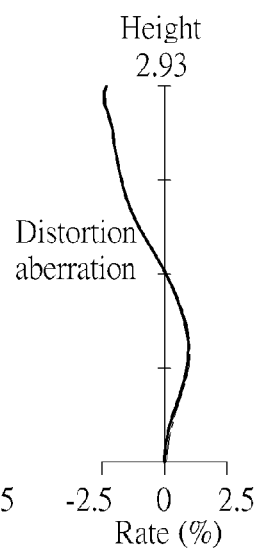
FIG. 18A    FIG. 18B    FIG. 18C    FIG. 18D

| | | First Example | | | | | |
|---|---|---|---|---|---|---|---|
| | | EFL(Effective Focal Length)= 3.850 mm, | | | | | |
| | | HFOV(Half Field Of View)= 36.42 deg., Fno= 2.4 | | | | | |
| No. | | Curvature Radius | Ape. Stop Distance Lens Thickness Air Gap | Refractive Index | Abbe No. | Material | Focal Length |
| | Object | Infinite | 600.00000 | | | | |
| 80 | Ape. Stop | Infinite | -0.194 | | | | |
| 11 | First Lens | 1.737 | 0.401 | 1.546 | 56.114 | Plastic | 4.463 |
| 12 | | 5.560 | 0.234 | | | | |
| 21 | Second Lens | 3.458 | 0.236 | 1.647 | 22.440 | Plastic | -8.919 |
| 22 | | 2.104 | 0.205 | | | | |
| 31 | Third Lens | 11.139 | 0.602 | 1.546 | 56.114 | Plastic | 4.527 |
| 32 | | -3.116 | 0.407 | | | | |
| 41 | Fourth Lens | -1.253 | 0.301 | 1.647 | 22.440 | Plastic | -5.771 |
| 42 | | -2.065 | 0.128 | | | | |
| 51 | Fifth Lens | 2.065 | 0.544 | 1.546 | 56.114 | Plastic | 7.181 |
| 52 | | 3.958 | 0.287 | | | | |
| 61 | Sixth Lens | 2.149 | 0.541 | 1.546 | 56.114 | Plastic | -7.777 |
| 62 | | 1.300 | 0.400 | | | | |
| 72 | Filter | Infinite | 0.210 | | | | |
| | Filter -Image Plane | Infinite | 0.447 | | | | |
| 71 | Image Plane | Infinite | | | | | |

FIG. 22

| No. | 11 | 12 | 21 | 22 | 31 | 32 |
|---|---|---|---|---|---|---|
| K | -8.013E-01 | 0.000E+00 | 0.000E+00 | 0.000E+00 | 0.000E+00 | -1.582E+01 |
| a4 | 2.266E-02 | -5.966E-02 | -2.646E-01 | -2.331E-01 | -3.277E-02 | -8.283E-02 |
| a6 | 2.977E-02 | 7.427E-02 | 1.132E-01 | 1.057E-01 | 7.172E-03 | 4.200E-02 |
| a8 | -3.375E-02 | -8.376E-02 | 5.692E-02 | 3.436E-02 | -1.835E-01 | -1.025E-01 |
| a10 | 5.448E-02 | 8.992E-02 | -1.200E-01 | -2.394E-02 | 3.536E-01 | 7.538E-02 |
| a12 | -2.567E-02 | -5.785E-02 | 2.464E-02 | -6.866E-02 | -3.168E-01 | -2.982E-02 |
| a14 | 0.000E+00 | 0.000E+00 | 0.000E+00 | 4.746E-02 | 1.025E-01 | 6.140E-03 |
| No. | 41 | 42 | 51 | 52 | 61 | 62 |
| K | -4.072E+00 | -1.347E+00 | -6.744E+00 | 2.575E+00 | -1.000E+00 | -1.000E+00 |
| a4 | -1.088E-01 | -1.245E-01 | -4.425E-02 | 5.728E-02 | -2.965E-01 | -3.090E-01 |
| a6 | 9.003E-02 | 1.382E-01 | -2.520E-02 | -1.277E-01 | 1.312E-01 | 1.600E-01 |
| a8 | -9.850E-02 | -1.231E-01 | 1.896E-03 | 7.598E-02 | -2.705E-02 | -6.134E-02 |
| a10 | 3.706E-02 | 7.844E-02 | -1.710E-03 | -2.772E-02 | -1.083E-03 | 1.542E-02 |
| a12 | 3.434E-02 | -1.887E-02 | 4.859E-04 | 5.548E-03 | 1.706E-03 | -2.334E-03 |
| a14 | -1.862E-02 | 1.078E-03 | -4.542E-05 | -4.826E-04 | -3.138E-04 | 1.886E-04 |
| a16 | 0.000E+00 | 0.000E+00 | 0.000E+00 | 5.355E-06 | 1.942E-05 | -6.147E-06 |

FIG. 23

| | | Second Example | | | | | |
|---|---|---|---|---|---|---|---|
| | | EFL(Effective Focal Length)= 4.052 mm. | | | | | |
| | | HFOV(Half Field Of View)= 35.0 deg., Fno= 2.4 | | | | | |
| No. | | Curvature Radius | Ape. Stop Distance Lens Thickness Air Gap | Refractive Index | Abbe No. | Material | Focal Length |
| | Object | Infinite | 600.00000 | | | | |
| 80 | Ape. Stop | Infinite | -0.239 | | | | |
| 11 | First Lens | 1.625 | 0.459 | 1.546 | 56.114 | Plastic | 4.102 |
| 12 | | 5.331 | 0.271 | | | | |
| 21 | Second Lens | 7.769 | 0.230 | 1.647 | 22.440 | Plastic | -6.831 |
| 22 | | 2.784 | 0.204 | | | | |
| 31 | Third Lens | 8.441 | 0.519 | 1.546 | 56.114 | Plastic | 4.728 |
| 32 | | -3.638 | 0.459 | | | | |
| 41 | Fourth Lens | -1.363 | 0.382 | 1.647 | 22.440 | Plastic | -7.055 |
| 42 | | -2.156 | 0.105 | | | | |
| 51 | Fifth Lens | 2.215 | 0.599 | 1.546 | 56.114 | Plastic | 13.827 |
| 52 | | 2.835 | 0.308 | | | | |
| 61 | Sixth Lens | 1.681 | 0.501 | 1.546 | 56.114 | Plastic | -14.702 |
| 62 | | 1.244 | 0.450 | | | | |
| 72 | Filter | Infinite | 0.210 | | | | |
| | Filter -Image Plane | Infinite | 0.413 | | | | |
| 71 | Image Plane | Infinite | | | | | |

FIG. 24

| No. | 11 | 12 | 21 | 22 | 31 | 32 |
|---|---|---|---|---|---|---|
| K | -7.235E-01 | 0.000E+00 | 0.000E+00 | 0.000E+00 | 0.000E+00 | 0.000E+00 |
| a4 | 2.619E-02 | -4.397E-02 | -2.264E-01 | -1.964E-01 | -4.676E-02 | -2.417E-02 |
| a6 | 2.024E-02 | 3.366E-02 | 1.243E-01 | 1.321E-01 | -6.237E-03 | -2.995E-03 |
| a8 | -3.099E-02 | -6.984E-02 | 6.110E-02 | 3.773E-02 | -1.714E-01 | -7.536E-02 |
| a10 | 5.867E-02 | 9.725E-02 | -1.182E-01 | -1.978E-02 | 3.322E-01 | 5.910E-02 |
| a12 | -3.951E-02 | -7.470E-02 | 3.226E-02 | -5.647E-02 | -3.022E-01 | -2.170E-02 |
| a14 | 0.000E+00 | 0.000E+00 | 0.000E+00 | 4.503E-02 | 1.028E-01 | 4.079E-03 |
| No. | 41 | 42 | 51 | 52 | 61 | 62 |
| K | 0.000E+00 | -1.612E+00 | 0.000E+00 | 0.000E+00 | -1.000E+00 | -1.000E+00 |
| a4 | 7.683E-02 | -1.272E-01 | -1.237E-01 | 8.230E-03 | -2.980E-01 | -3.085E-01 |
| a6 | -1.320E-02 | 1.284E-01 | 3.650E-02 | -4.749E-02 | 1.372E-01 | 1.597E-01 |
| a8 | 1.646E-02 | -1.222E-01 | -4.237E-02 | 1.833E-02 | -3.941E-02 | -6.535E-02 |
| a10 | -6.612E-02 | 7.300E-02 | 1.641E-02 | -3.850E-03 | 7.425E-03 | 1.770E-02 |
| a12 | 1.060E-01 | -1.809E-02 | -2.431E-03 | 4.394E-04 | -8.798E-04 | -2.852E-03 |
| a14 | -5.038E-02 | 1.185E-03 | 0.000E+00 | -2.537E-05 | 4.672E-05 | 2.449E-04 |
| a16 | 7.539E-03 | 0.000E+00 | 0.000E+00 | 0.000E+00 | 0.000E+00 | -8.610E-06 |

FIG. 25

| Third Example | | | | | | |
|---|---|---|---|---|---|---|
| EFL(Effective Focal Length)= 4.239 mm, | | | | | | |
| HFOV(Half Field Of View)= 33.74 deg., Fno= 2.4 | | | | | | |
| No. | | Curvature Radius | Ape. Stop Distance Lens Thickness Air Gap | Refractive Index | Abbe No. | Material | Focal Length |
| | Object | Infinite | 600.00000 | | | | |
| 80 | Ape. Stop | Infinite | -0.248 | | | | |
| 11 | First Lens | 1.710 | 0.663 | 1.546 | 56.114 | Plastic | 4.697 |
| 12 | | 4.432 | 0.293 | | | | |
| 21 | Second Lens | 4.796 | 0.230 | 1.647 | 22.440 | Plastic | -5.821 |
| 22 | | 2.070 | 0.117 | | | | |
| 31 | Third Lens | 4.579 | 0.609 | 1.546 | 56.114 | Plastic | 4.167 |
| 32 | | -4.310 | 0.408 | | | | |
| 41 | Fourth Lens | -1.651 | 0.355 | 1.647 | 22.440 | Plastic | -20.496 |
| 42 | | -2.046 | 0.112 | | | | |
| 51 | Fifth Lens | 2.501 | 0.482 | 1.546 | 56.114 | Plastic | 24.778 |
| 52 | | 2.859 | 0.449 | | | | |
| 61 | Sixth Lens | 2.382 | 0.488 | 1.546 | 56.114 | Plastic | -7.561 |
| 62 | | 1.401 | 0.450 | | | | |
| 72 | Filter | Infinite | 0.210 | | | | |
| | Filter -Image Plane | Infinite | 0.390 | | | | |
| 71 | Image Plane | Infinite | | | | | |

FIG. 26

| No. | 11 | 12 | 21 | 22 | 31 | 32 |
|---|---|---|---|---|---|---|
| K | -7.976E-01 | 0.000E+00 | 0.000E+00 | 0.000E+00 | 0.000E+00 | 0.000E+00 |
| a4 | 2.370E-02 | -3.414E-02 | -2.467E-01 | -2.162E-01 | -1.027E-03 | -1.650E-02 |
| a6 | 7.676E-03 | 1.628E-02 | 1.145E-01 | 1.294E-01 | -3.031E-02 | 1.553E-03 |
| a8 | 2.175E-03 | -1.930E-02 | -1.571E-02 | -1.884E-02 | 2.483E-02 | -7.965E-03 |
| a10 | 0.000E+00 | 0.000E+00 | -1.600E-02 | 3.546E-03 | -2.932E-03 | 5.665E-03 |
| No. | 41 | 42 | 51 | 52 | 61 | 62 |
| K | 0.000E+00 | -5.112E+00 | 0.000E+00 | 0.000E+00 | -1.000E+00 | -1.000E+00 |
| a4 | 2.361E-02 | -1.450E-01 | -1.040E-01 | -1.190E-02 | -2.467E-01 | -2.639E-01 |
| a6 | 1.976E-02 | 1.147E-01 | 2.125E-02 | -4.056E-02 | 9.232E-02 | 1.280E-01 |
| a8 | -8.636E-02 | -1.219E-01 | -3.785E-02 | 1.428E-02 | -1.871E-02 | -4.992E-02 |
| a10 | 8.001E-02 | 7.241E-02 | 1.565E-02 | -2.183E-03 | 2.302E-03 | 1.326E-02 |
| a12 | -1.986E-02 | -1.809E-02 | -2.308E-03 | 1.043E-04 | -2.863E-04 | -2.151E-03 |
| a14 | 0.000E+00 | 1.414E-03 | 0.000E+00 | 0.000E+00 | 2.344E-05 | 1.885E-04 |
| a16 | 0.000E+00 | 0.000E+00 | 0.000E+00 | 0.000E+00 | 0.000E+00 | -6.799E-06 |

FIG. 27

| Fourth Example | | | | | | |
|---|---|---|---|---|---|---|
| EFL(Effective Focal Length)= 4.228 mm, | | | | | | |
| HFOV(Half Field Of View)= 34.0 deg., Fno= 2.4 | | | | | | |
| No. | | Curvature Radius | Ape. Stop Distance Lens Thickness Air Gap | Refractive Index | Abbe No. | Material | Focal Length |
| | Object | Infinite | 600.00000 | | | | |
| 80 | Ape. Stop | Infinite | -0.243 | | | | |
| 11 | First Lens | 1.723 | 0.590 | 1.546 | 56.114 | Plastic | 4.118 |
| 12 | | 6.494 | 0.200 | | | | |
| 21 | Second Lens | 3.314 | 0.252 | 1.647 | 22.440 | Plastic | -6.802 |
| 22 | | 1.834 | 0.271 | | | | |
| 31 | Third Lens | 11.671 | 0.537 | 1.546 | 56.114 | Plastic | 5.903 |
| 32 | | -4.379 | 0.280 | | | | |
| 41 | Fourth Lens | -1.632 | 0.312 | 1.647 | 22.440 | Plastic | -10.632 |
| 42 | | -2.300 | 0.213 | | | | |
| 51 | Fifth Lens | 1.735 | 0.330 | 1.546 | 56.114 | Plastic | 12.119 |
| 52 | | 2.194 | 0.640 | | | | |
| 61 | Sixth Lens | 1.872 | 0.465 | 1.546 | 56.114 | Plastic | -10.473 |
| 62 | | 1.287 | 0.450 | | | | |
| 72 | Filter | Infinite | 0.210 | | | | |
| | Filter -Image Plane | Infinite | 0.427 | | | | |
| 71 | Image Plane | Infinite | | | | | |

FIG. 28

| No. | 11 | 12 | 21 | 22 | 31 | 32 |
|---|---|---|---|---|---|---|
| K | -8.145E-01 | 0.000E+00 | 0.000E+00 | 0.000E+00 | 0.000E+00 | 0.000E+00 |
| a4 | 2.363E-02 | -6.066E-02 | -2.321E-01 | -1.891E-01 | 1.632E-03 | 5.262E-03 |
| a6 | 8.320E-03 | 4.979E-02 | 1.393E-01 | 1.387E-01 | -2.817E-02 | -1.303E-02 |
| a8 | 1.133E-03 | -2.430E-02 | -1.479E-02 | -2.278E-02 | 1.435E-02 | -7.713E-03 |
| a10 | 0.000E+00 | 0.000E+00 | -2.427E-02 | -1.117E-03 | -1.025E-03 | 5.234E-03 |
| No. | 41 | 42 | 51 | 52 | 61 | 62 |
| K | 0.000E+00 | -2.224E+00 | 0.000E+00 | 0.000E+00 | -1.000E+00 | -1.000E+00 |
| a4 | 2.438E-02 | -1.327E-01 | -1.389E-01 | -2.438E-02 | -2.500E-01 | -2.717E-01 |
| a6 | 2.919E-02 | 1.248E-01 | 2.967E-02 | -5.167E-02 | 9.385E-02 | 1.285E-01 |
| a8 | -7.731E-02 | -1.179E-01 | -3.898E-02 | 1.884E-02 | -2.227E-02 | -4.817E-02 |
| a10 | 8.274E-02 | 7.315E-02 | 1.528E-02 | -3.821E-03 | 3.313E-03 | 1.209E-02 |
| a12 | -2.060E-02 | -1.799E-02 | -2.574E-03 | 4.306E-04 | -2.642E-04 | -1.850E-03 |
| a14 | 0.000E+00 | 1.592E-03 | 0.000E+00 | -2.526E-05 | 8.425E-06 | 1.540E-04 |
| a16 | 0.000E+00 | 0.000E+00 | 0.000E+00 | 0.000E+00 | 0.000E+00 | -5.274E-06 |

FIG. 29

| No. | | Curvature Radius | Ape. Stop Distance Lens Thickness Air Gap | Refractive Index | Abbe No. | Material | Focal Length |
|---|---|---|---|---|---|---|---|
| | Fifth Example |
| | EFL(Effective Focal Length)= 4.209 mm, |
| | HFOV(Half Field Of View)= 34.0 deg., Fno= 2.4 |
| | Object | Infinite | 600.00000 | | | | |
| 80 | Ape. Stop | Infinite | −0.252 | | | | |
| 11 | First Lens | 1.654 | 0.428 | 1.546 | 56.114 | Plastic | 4.180 |
| 12 | | 5.455 | 0.236 | | | | |
| 21 | Second Lens | 6.368 | 0.230 | 1.647 | 22.440 | Plastic | −8.371 |
| 22 | | 2.885 | 0.292 | | | | |
| 31 | Third Lens | 15.585 | 0.635 | 1.546 | 56.114 | Plastic | 5.000 |
| 32 | | −3.262 | 0.462 | | | | |
| 41 | Fourth Lens | −1.376 | 0.431 | 1.647 | 22.440 | Plastic | −8.621 |
| 42 | | −2.051 | 0.075 | | | | |
| 51 | Fifth Lens | 2.563 | 0.605 | 1.546 | 56.114 | Plastic | 31.812 |
| 52 | | 2.756 | 0.345 | | | | |
| 61 | Sixth Lens | 1.463 | 0.380 | 1.546 | 56.114 | Plastic | −16.014 |
| 62 | | 1.138 | 0.450 | | | | |
| 72 | Filter | Infinite | 0.210 | | | | |
| | Filter -Image Plane | Infinite | 0.492 | | | | |
| 71 | Image Plane | Infinite | | | | | |

FIG. 30

| No. | 11 | 12 | 21 | 22 | 31 | 32 |
|---|---|---|---|---|---|---|
| K | -7.601E-01 | 0.000E+00 | 0.000E+00 | 0.000E+00 | 0.000E+00 | 0.000E+00 |
| a4 | 2.601E-02 | -5.347E-02 | -2.219E-01 | -1.867E-01 | -6.283E-02 | -4.903E-02 |
| a6 | 2.490E-02 | 4.046E-02 | 1.173E-01 | 1.290E-01 | 6.215E-04 | -6.929E-03 |
| a8 | -3.864E-02 | -5.815E-02 | 5.698E-02 | 2.128E-02 | -1.644E-01 | -5.492E-02 |
| a10 | 6.216E-02 | 7.463E-02 | -1.064E-01 | -2.242E-02 | 3.075E-01 | 5.315E-02 |
| a12 | -3.217E-02 | -4.630E-02 | 4.065E-02 | -4.467E-02 | -3.094E-01 | -2.984E-02 |
| a14 | 0.000E+00 | 0.000E+00 | 0.000E+00 | 4.593E-02 | 1.148E-01 | 7.916E-03 |
| No. | 41 | 42 | 51 | 52 | 61 | 62 |
| K | 0.000E+00 | -3.395E+00 | 0.000E+00 | 0.000E+00 | -1.000E+00 | -1.000E+00 |
| a4 | 6.165E-02 | -1.266E-01 | -1.110E-01 | 1.372E-03 | -2.936E-01 | -3.228E-01 |
| a6 | -5.489E-03 | 1.273E-01 | 3.056E-02 | -4.550E-02 | 1.316E-01 | 1.642E-01 |
| a8 | 1.203E-02 | -1.233E-01 | -4.164E-02 | 1.809E-02 | -3.830E-02 | -6.576E-02 |
| a10 | -6.515E-02 | 7.125E-02 | 1.639E-02 | -3.882E-03 | 7.450E-03 | 1.770E-02 |
| a12 | 1.041E-01 | -1.805E-02 | -2.283E-03 | 4.395E-04 | -8.853E-04 | -2.851E-03 |
| a14 | -5.178E-02 | 1.504E-03 | 0.000E+00 | -2.418E-05 | 4.529E-05 | 2.449E-04 |
| a16 | 8.755E-03 | 0.000E+00 | 0.000E+00 | 0.000E+00 | 0.000E+00 | -8.616E-06 |

FIG. 31

| | | Sixth Example | | | | |
|---|---|---|---|---|---|---|
| | | EFL(Effective Focal Length)= 4.154 mm. | | | | |
| | | HFOV(Half Field Of View)= 34.33 deg., Fno= 2.4 | | | | |
| No. | | Curvature Radius | Ape. Stop Distance Lens Thickness Air Gap | Refractive Index | Abbe No. | Material | Focal Length |
| | Object | Infinite | 600.00000 | | | | |
| 80 | Ape. Stop | Infinite | -0.244 | | | | |
| 11 | First Lens | 1.702 | 0.404 | 1.546 | 56.114 | Plastic | 4.308 |
| 12 | | 5.645 | 0.284 | | | | |
| 21 | Second Lens | 6.794 | 0.233 | 1.647 | 22.440 | Plastic | -6.772 |
| 22 | | 2.628 | 0.168 | | | | |
| 31 | Third Lens | 7.354 | 0.752 | 1.546 | 56.114 | Plastic | 4.424 |
| 32 | | -3.466 | 0.490 | | | | |
| 41 | Fourth Lens | -1.444 | 0.383 | 1.647 | 22.440 | Plastic | -8.926 |
| 42 | | -2.126 | 0.060 | | | | |
| 51 | Fifth Lens | 2.409 | 0.564 | 1.546 | 56.114 | Plastic | 26.145 |
| 52 | | 2.658 | 0.341 | | | | |
| 61 | Sixth Lens | 1.792 | 0.505 | 1.546 | 56.114 | Plastic | -11.966 |
| 62 | | 1.267 | 0.450 | | | | |
| 72 | Filter | Infinite | 0.210 | | | | |
| | Filter -Image Plane | Infinite | 0.414 | | | | |
| 71 | Image Plane | Infinite | | | | | |

FIG. 32

| No. | 11 | 12 | 21 | 22 | 31 | 32 |
|---|---|---|---|---|---|---|
| K | -7.366E-01 | 0.000E+00 | 0.000E+00 | 0.000E+00 | 0.000E+00 | 0.000E+00 |
| a4 | 2.534E-02 | -3.588E-02 | -2.309E-01 | -2.175E-01 | -4.878E-02 | -3.059E-02 |
| a6 | 2.576E-02 | 3.338E-02 | 1.176E-01 | 1.152E-01 | -1.529E-02 | 1.349E-03 |
| a8 | -3.688E-02 | -4.983E-02 | 3.982E-02 | 2.818E-02 | -1.258E-01 | -4.991E-02 |
| a10 | 6.271E-02 | 6.757E-02 | -1.032E-01 | -2.533E-02 | 3.030E-01 | 5.103E-02 |
| a12 | -3.191E-02 | -4.680E-02 | 3.829E-02 | -5.646E-02 | -3.214E-01 | -2.804E-02 |
| a14 | 0.000E+00 | 0.000E+00 | 0.000E+00 | 5.289E-02 | 1.256E-01 | 7.555E-03 |
| No. | 41 | 42 | 51 | 52 | 61 | 62 |
| K | 0.000E+00 | -3.730E+00 | 0.000E+00 | 0.000E+00 | -1.000E+00 | -1.000E+00 |
| a4 | 5.399E-02 | -1.324E-01 | -1.009E-01 | 4.460E-03 | -2.898E-01 | -3.038E-01 |
| a6 | -4.066E-03 | 1.253E-01 | 1.800E-02 | -4.900E-02 | 1.361E-01 | 1.601E-01 |
| a8 | 6.913E-03 | -1.225E-01 | -3.499E-02 | 1.880E-02 | -3.945E-02 | -6.555E-02 |
| a10 | -6.607E-02 | 7.144E-02 | 1.378E-02 | -3.795E-03 | 7.466E-03 | 1.770E-02 |
| a12 | 1.044E-01 | -1.771E-02 | -1.950E-03 | 4.094E-04 | -8.792E-04 | -2.848E-03 |
| a14 | -5.178E-02 | 1.503E-03 | 0.000E+00 | -2.444E-05 | 4.490E-05 | 2.453E-04 |
| a16 | 8.782E-03 | 0.000E+00 | 0.000E+00 | 0.000E+00 | 0.000E+00 | -8.702E-06 |

FIG. 33

| No. | | Curvature Radius | Ape. Stop Distance Lens Thickness Air Gap | Refractive Index | Abbe No. | Material | Focal Length |
|---|---|---|---|---|---|---|---|
| | | Seventh Example | | | | | |
| | | EFL(Effective Focal Length)= 4.199 mm. | | | | | |
| | | HFOV(Half Field Of View)= 34.0 deg., Fno= 2.4 | | | | | |
| | Object | Infinite | 600.00000 | | | | |
| 80 | Ape. Stop | Infinite | -0.251 | | | | |
| 11 | First Lens | 1.664 | 0.433 | 1.546 | 56.114 | Plastic | 4.047 |
| 12 | | 6.120 | 0.202 | | | | |
| 21 | Second Lens | 5.814 | 0.230 | 1.647 | 22.440 | Plastic | -8.833 |
| 22 | | 2.837 | 0.353 | | | | |
| 31 | Third Lens | 17.841 | 0.555 | 1.546 | 56.114 | Plastic | 5.518 |
| 32 | | -3.584 | 0.476 | | | | |
| 41 | Fourth Lens | -1.425 | 0.400 | 1.647 | 22.440 | Plastic | -7.573 |
| 42 | | -2.231 | 0.060 | | | | |
| 51 | Fifth Lens | 2.533 | 0.614 | 1.546 | 56.114 | Plastic | 20.469 |
| 52 | | 2.996 | 0.318 | | | | |
| 61 | Sixth Lens | 1.813 | 0.507 | 1.546 | 56.114 | Plastic | -12.562 |
| 62 | | 1.292 | 0.450 | | | | |
| 72 | Filter | Infinite | 0.210 | | | | |
| | Filter -Image Plane | Infinite | 0.399 | | | | |
| 71 | Image Plane | Infinite | | | | | |

FIG. 34

| No. | 11 | 12 | 21 | 22 | 31 | 32 |
|---|---|---|---|---|---|---|
| K | -7.534E-01 | 0.000E+00 | 0.000E+00 | 0.000E-00 | 0.000E+00 | 0.000E+00 |
| a4 | 2.553E-02 | -6.227E-02 | -2.154E-01 | -1.676E-01 | -6.066E-02 | -4.960E-02 |
| a6 | 2.397E-02 | 5.064E-02 | 1.242E-01 | 1.314E-01 | 8.161E-03 | -1.055E-02 |
| a8 | -3.840E-02 | -6.056E-02 | 5.489E-02 | 1.496E-02 | -1.837E-01 | -5.925E-02 |
| a10 | 6.044E-02 | 7.356E-02 | -1.104E-01 | -2.251E-02 | 3.124E-01 | 5.274E-02 |
| a12 | -3.072E-02 | -4.401E-02 | 4.298E-02 | -4.021E-02 | -3.003E-01 | -2.921E-02 |
| a14 | 0.000E+00 | 0.000E+00 | 0.000E+00 | 4.257E-02 | 1.057E-01 | 7.751E-03 |
| No. | 41 | 42 | 51 | 52 | 61 | 62 |
| K | 0.000E+00 | -2.757E+00 | 0.000E+00 | 0.000E-00 | -1.000E+00 | -1.000E+00 |
| a4 | 6.619E-02 | -1.227E-01 | -1.108E-01 | 1.163E-02 | -2.888E-01 | -3.021E-01 |
| a6 | -6.488E-03 | 1.288E-01 | 3.022E-02 | -4.754E-02 | 1.357E-01 | 1.576E-01 |
| a8 | 1.273E-02 | -1.220E-01 | -4.209E-02 | 1.827E-02 | -3.946E-02 | -6.510E-02 |
| a10 | -6.573E-02 | 7.199E-02 | 1.629E-02 | -3.808E-03 | 7.456E-03 | 1.770E-02 |
| a12 | 1.049E-01 | -1.809E-02 | -2.302E-03 | 4.332E-04 | -8.753E-04 | -2.854E-03 |
| a14 | -5.153E-02 | 1.409E-03 | 0.000E+00 | -2.450E-05 | 4.632E-05 | 2.448E-04 |
| a16 | 8.184E-03 | 0.000E+00 | 0.000E+00 | 0.000E-00 | 0.000E+00 | -8.586E-06 |

FIG. 35

| \multicolumn{7}{c|}{Eighth Example} |
| \multicolumn{7}{c|}{EFL(Effective Focal Length)= 4.219 mm,} |
| \multicolumn{7}{c|}{HFOV(Half Field Of View)= 34.0 deg., Fno= 2.4} |

| No. | | Curvature Radius | Ape. Stop Distance Lens Thickness Air Gap | Refractive Index | Abbe No. | Material | Focal Length |
|---|---|---|---|---|---|---|---|
| | Object | Infinite | 600.00000 | | | | |
| 80 | Ape. Stop | Infinite | -0.222 | | | | |
| 11 | First Lens | 1.735 | 0.585 | 1.546 | 56.114 | Plastic | 3.643 |
| 12 | | 11.960 | 0.066 | | | | |
| 21 | Second Lens | 8.054 | 0.230 | 1.647 | 22.440 | Plastic | -8.692 |
| 22 | | 3.274 | 0.295 | | | | |
| 31 | Third Lens | -75.799 | 0.692 | 1.546 | 56.114 | Plastic | 6.665 |
| 32 | | -3.483 | 0.386 | | | | |
| 41 | Fourth Lens | -1.374 | 0.298 | 1.647 | 22.440 | Plastic | -7.848 |
| 42 | | -2.045 | 0.180 | | | | |
| 51 | Fifth Lens | 2.230 | 0.498 | 1.546 | 56.114 | Plastic | 13.864 |
| 52 | | 2.913 | 0.418 | | | | |
| 61 | Sixth Lens | 2.223 | 0.496 | 1.546 | 56.114 | Plastic | -8.222 |
| 62 | | 1.370 | 0.450 | | | | |
| 72 | Filter | Infinite | 0.210 | | | | |
| | Filter -Image Plane | Infinite | 0.380 | | | | |
| 71 | Image Plane | Infinite | | | | | |

FIG. 36

| No. | 11 | 12 | 21 | 22 | 31 | 32 |
|---|---|---|---|---|---|---|
| K | -7.330E-01 | 0.000E+00 | 0.000E+00 | 0.000E+00 | 0.000E+00 | 0.000E+00 |
| a4 | 2.376E-02 | -9.757E-02 | -2.035E-01 | -1.413E-01 | -8.271E-02 | -4.760E-02 |
| a6 | 1.833E-02 | 8.042E-02 | 1.336E-01 | 7.629E-02 | -1.711E-02 | -1.557E-02 |
| a8 | -4.345E-02 | -6.317E-02 | 5.351E-02 | 3.401E-02 | -1.756E-01 | -5.960E-02 |
| a10 | 6.769E-02 | 6.927E-02 | -1.038E-01 | -1.992E-02 | 3.210E-01 | 5.661E-02 |
| a12 | -4.037E-02 | -5.800E-02 | 3.447E-02 | -4.939E-02 | -3.068E-01 | -2.431E-02 |
| a14 | 0.000E+00 | 0.000E+00 | 0.000E+00 | 4.622E-02 | 1.036E-01 | 4.367E-03 |
| No. | 41 | 42 | 51 | 52 | 61 | 62 |
| K | 0.000E+00 | -3.285E+00 | 0.000E+00 | 0.000E+00 | -1.000E+00 | -1.000E+00 |
| a4 | 5.653E-02 | -1.417E-01 | -1.288E-01 | 6.264E-03 | -2.773E-01 | -2.952E-01 |
| a6 | -1.172E-02 | 1.284E-01 | 3.308E-02 | -5.010E-02 | 1.341E-01 | 1.576E-01 |
| a8 | 7.568E-03 | -1.172E-01 | -4.082E-02 | 1.863E-02 | -3.942E-02 | -6.535E-02 |
| a10 | -6.335E-02 | 7.280E-02 | 1.374E-02 | -3.682E-03 | 7.475E-03 | 1.770E-02 |
| a12 | 1.080E-01 | -1.820E-02 | -1.621E-03 | 4.318E-04 | -8.736E-04 | -2.850E-03 |
| a14 | -5.020E-02 | 1.782E-03 | 0.000E+00 | -2.969E-05 | 4.655E-05 | 2.451E-04 |
| a16 | 7.005E-03 | 0.000E+00 | 0.000E+00 | 0.000E+00 | 0.000E+00 | -8.633E-06 |

FIG. 37

| | | Curvature Radius | Ape. Stop Distance Lens Thickness Air Gap | Refractive Index | Abbe No. | Material | Focal Length |
|---|---|---|---|---|---|---|---|
| \multicolumn{8}{c}{Ninth Example} |
| \multicolumn{8}{c}{EFL(Effective Focal Length)= 4.395 mm,} |
| \multicolumn{8}{c}{HFOV(Half Field Of View)= 34.0 deg., Fno= 2.4} |
| No. | | | | | | | |
| | Object | Infinite | 600.00000 | | | | |
| 80 | Ape. Stop | Infinite | -0.291 | | | | |
| 11 | First Lens | 1.641 | 0.451 | 1.546 | 56.114 | Plastic | 3.988 |
| 12 | | 6.023 | 0.284 | | | | |
| 21 | Second Lens | 5.163 | 0.230 | 1.647 | 22.440 | Plastic | -6.670 |
| 22 | | 2.309 | 0.168 | | | | |
| 31 | Third Lens | 4.601 | 0.559 | 1.546 | 56.114 | Plastic | 4.634 |
| 32 | | -5.378 | 0.240 | | | | |
| 41 | Fourth Lens | -1.302 | 0.284 | 1.647 | 22.440 | Plastic | -9.201 |
| 42 | | -1.810 | 0.060 | | | | |
| 51 | Fifth Lens | 7.465 | 1.759 | 1.546 | 56.114 | Plastic | 29.335 |
| 52 | | 12.818 | 0.100 | | | | |
| 61 | Sixth Lens | 1.841 | 0.300 | 1.546 | 56.114 | Plastic | -8.205 |
| 62 | | 1.230 | 0.450 | | | | |
| 72 | Filter | Infinite | 0.210 | | | | |
| | Filter -Image Plane | Infinite | 0.408 | | | | |
| 71 | Image Plane | Infinite | | | | | |

FIG. 38

| No. | 11 | 12 | 21 | 22 | 31 | 32 |
|---|---|---|---|---|---|---|
| K | -7.326E-01 | 0.000E+00 | 0.000E+00 | 0.000E+00 | 0.000E+00 | 0.000E+00 |
| a4 | 2.544E-02 | -3.814E-02 | -2.237E-01 | -2.168E-01 | -4.988E-02 | -7.309E-02 |
| a6 | 2.464E-02 | 4.227E-02 | 1.127E-01 | 1.134E-01 | -3.860E-04 | 9.613E-03 |
| a8 | -3.830E-02 | -6.766E-02 | 4.918E-02 | 2.873E-02 | -1.614E-01 | -6.921E-02 |
| a10 | 6.268E-02 | 8.921E-02 | -1.147E-01 | -2.577E-02 | 3.263E-01 | 5.403E-02 |
| a12 | -3.016E-02 | -5.436E-02 | 3.807E-02 | -5.795E-02 | -3.074E-01 | -2.633E-02 |
| a14 | 0.000E+00 | 0.000E+00 | 0.000E+00 | 5.038E-02 | 9.885E-02 | 3.520E-03 |
| No. | 41 | 42 | 51 | 52 | 61 | 62 |
| K | 0.000E+00 | -2.545E+00 | 0.000E+00 | 0.000E+00 | -1.000E+00 | -1.000E+00 |
| a4 | 5.088E-02 | -1.295E-01 | -1.661E-01 | 4.142E-02 | -2.613E-01 | -3.253E-01 |
| a6 | 1.633E-02 | 1.161E-01 | 6.295E-02 | -3.933E-02 | 1.283E-01 | 1.680E-01 |
| a8 | 2.323E-02 | -1.133E-01 | -6.706E-02 | 1.593E-02 | -3.850E-02 | -6.581E-02 |
| a10 | -6.158E-02 | 7.765E-02 | 1.556E-02 | -3.784E-03 | 7.525E-03 | 1.765E-02 |
| a12 | 1.082E-01 | -1.628E-02 | 2.321E-03 | 4.643E-04 | -8.815E-04 | -2.854E-03 |
| a14 | -5.031E-02 | 2.001E-03 | 0.000E+00 | -2.420E-05 | 4.418E-05 | 2.451E-04 |
| a16 | 6.421E-03 | 0.000E+00 | 0.000E+00 | 0.000E+00 | 0.000E+00 | -8.532E-06 |

FIG. 39

|  | Example 1 | Example 2 | Example 3 | Example 4 | Example 5 | Example 6 | Example 7 | Example 8 | Example 9 |
|---|---|---|---|---|---|---|---|---|---|
| EFL | 3.85 | 4.052 | 4.239 | 4.228 | 4.209 | 4.154 | 4.199 | 4.219 | 4.395 |
| AAG | 1.261 | 1.347 | 1.379 | 1.604 | 1.41 | 1.343 | 1.409 | 1.345 | 0.852 |
| ALT | 2.625 | 2.69 | 2.827 | 2.486 | 2.709 | 2.841 | 2.739 | 2.799 | 3.583 |
| BFL | 1.057 | 1.073 | 1.05 | 1.087 | 1.152 | 1.074 | 1.059 | 1.04 | 1.068 |
| TTL | 4.943 | 5.11 | 5.256 | 5.177 | 5.271 | 5.258 | 5.207 | 5.184 | 5.503 |
| T1/T6 | 0.741 | 0.916 | 1.359 | 1.269 | 1.126 | 0.800 | 0.854 | 1.179 | 1.503 |
| BFL/G56 | 3.683 | 3.484 | 2.339 | 1.698 | 3.339 | 3.150 | 3.330 | 2.488 | 10.680 |
| EFL/G23 | 18.780 | 19.863 | 36.231 | 15.601 | 14.414 | 24.726 | 11.895 | 14.302 | 26.161 |
| AAG/G12 | 5.389 | 4.970 | 4.706 | 8.020 | 5.975 | 4.729 | 6.975 | 20.379 | 3.000 |
| BFL/T5 | 1.943 | 1.791 | 2.178 | 3.294 | 1.904 | 1.904 | 1.725 | 2.088 | 0.607 |
| T6/G23 | 2.639 | 2.456 | 4.171 | 1.716 | 1.301 | 3.006 | 1.436 | 1.681 | 1.786 |
| T5/T6 | 1.006 | 1.196 | 0.988 | 0.710 | 1.592 | 1.117 | 1.211 | 1.004 | 5.863 |
| T1/G12 | 1.714 | 1.694 | 2.263 | 2.950 | 1.814 | 1.423 | 2.144 | 8.864 | 1.588 |
| G56/G12 | 1.226 | 1.137 | 1.532 | 3.200 | 1.462 | 1.201 | 1.574 | 6.333 | 0.352 |
| T3/T4 | 2.000 | 1.359 | 1.715 | 1.721 | 1.473 | 1.963 | 1.388 | 2.322 | 1.968 |
| ALT/T6 | 4.852 | 5.369 | 5.793 | 5.346 | 7.129 | 5.626 | 5.402 | 5.643 | 11.943 |
| G23/G12 | 0.876 | 0.753 | 0.399 | 1.355 | 1.237 | 0.592 | 1.748 | 4.470 | 0.592 |
| T3/T5 | 1.107 | 0.866 | 1.263 | 1.627 | 1.050 | 1.333 | 0.904 | 1.390 | 0.318 |
| BFL/G23 | 5.156 | 5.260 | 8.974 | 4.011 | 3.945 | 6.393 | 3.000 | 3.525 | 6.357 |
| AAG/G12 | 5.389 | 4.970 | 4.706 | 8.020 | 5.975 | 4.729 | 6.975 | 20.379 | 3.000 |
| EFL/T5 | 7.077 | 6.765 | 8.795 | 12.812 | 6.957 | 7.365 | 6.839 | 8.472 | 2.499 |
| ALT/G12 | 11.218 | 9.926 | 9.648 | 12.430 | 11.479 | 10.004 | 13.559 | 42.409 | 12.616 |
| AAG/T6 | 2.331 | 2.689 | 2.826 | 3.449 | 3.711 | 2.659 | 2.779 | 2.712 | 2.840 |

FIG. 40

OPTICAL IMAGING LENS AND ELECTRONIC DEVICE COMPRISING THE SAME

CROSS REFERENCE TO RELATED APPLICATION

This application claims priority to Taiwan Application No. 103107733, filed on Mar. 6, 2014.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of six lens elements and an electronic device which includes such optical imaging lens set of six lens elements.

2. Description of the Prior Art

In recent years, the popularity of mobile phones and digital cameras makes photography modules (including optical imaging lens set, holder and sensor, etc) well developed. Mobile phones and digital cameras become lighter and thinner, so that the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality.

Conventional optical imaging lens sets are mostly with only four lens elements, and since they have fewer lens elements, the total length of the optical imaging lens set is relatively short. However, as the requirements of good imaging quality increase, the conventional optical imaging lens set of four lens elements can hardly satisfy these requirements. U.S. Pat. No. 7,663,814 and U.S. Pat. No. 8,040,618 disclose an optical imaging lens set of six lens elements respectively, and all of the total length (the distance between the first object surface of the first lens element to an image plane) of the optical imaging lens sets are over than 21 mm. The size of the optical imaging lens set is too big to satisfy the specification requirements of consumer electronics products. Therefore, a novel optical imaging lens set with small total length and good imaging quality is needed

SUMMARY OF THE INVENTION

In light of the above, the present invention proposes an optical imaging lens set that is lightweight has a low production cost, an enlarged half of field of view, a high resolution and high image quality. The optical imaging lens set of six lens elements of the present invention has a first lens element, a second lens element, a third lens element, a fourth lens element, a fifth lens element and a sixth lens element sequentially from an object side to an image side along an optical axis.

The present invention provides an optical imaging lens set, from an object side toward an image side in order along an optical axis comprising: a first lens element, a second lens element, a third lens element, a fourth lens element, a fifth lens element and a sixth lens element. The first lens element has positive refractive power. The second lens element has an object-side surface with a concave part in a vicinity of its periphery and an image-side surface with a concave part in a vicinity of its periphery. The fourth lens element has an image-side surface with a convex part in a vicinity of the optical axis. The fifth lens element has an object-side surface with a convex part in a vicinity of the optical axis and an image-side surface with a concave part in a vicinity of the optical axis, the sixth lens element having an image-side surface with a convex part in a vicinity of its periphery, and the sixth lens element being made of plastic. Wherein the optical imaging lens set does not include any lens element with refractive power other than said first, second, third, fourth, fifth and sixth lens elements.

In the optical imaging lens set of six lens elements of the present invention, an air gap G12 along the optical axis is disposed between the first lens element and the second lens element, an air gap G23 along the optical axis is disposed between the second lens element and the third lens element, an air gap G34 along the optical axis is disposed between the third lens element and the fourth lens element, an air gap G45 along the optical axis is disposed between the fourth lens element and the fifth lens element, an air gap G56 along the optical axis is disposed between the fifth lens element and the sixth lens element, and the sum of total five air gaps between adjacent lens elements from the first lens element to the sixth lens element along the optical axis is AAG, AAG=G12+G23+G34+G45+G56.

In the optical imaging lens set of six lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, the sixth lens element has a sixth lens element thickness T6 along the optical axis, and the total thickness of all the lens elements in the optical imaging lens set along the optical axis is ALT, ALT=T1+T2+T3+T4+T5+T6.

In addition, the distance between the image-side surface of the sixth lens element to an image plane along the optical axis is BFL (back focal length); the effective focal length of the optical imaging lens set is EFL.

In the optical imaging lens set of six lens elements of the present invention, the relationship $T1/T6 \leq 1.4$ is satisfied.

In the optical imaging lens set of six lens elements of the present invention, the relationship $2 \leq BFL/G56$ is satisfied.

In the optical imaging lens set of six lens elements of the present invention, the relationship $10.5 \leq EFL/G23 \leq 30$ is satisfied.

In the optical imaging lens set of six lens elements of the present invention, the relationship $AAG/G12 \leq 9$ is satisfied.

In the optical imaging lens set of six lens elements of the present invention, the relationship $1.9 \leq BFL/T5$ is satisfied.

In the optical imaging lens set of six lens elements of the present invention, the relationship $1 \leq T6/G23 \leq 3.5$ is satisfied.

In the optical imaging lens set of six lens elements of the present invention, the relationship $T5/T6 \leq 1.22$ is satisfied.

In the optical imaging lens set of six lens elements of the present invention, the relationship $T1/G12 \leq 3$ is satisfied.

In the optical imaging lens set of six lens elements of the present invention, the relationship $G56/G12 \leq 4$ is satisfied.

In the optical imaging lens set of six lens elements of the present invention, the relationship $1.1 \leq T3/T4$ is satisfied.

In the optical imaging lens set of six lens elements of the present invention, the relationship $ALT/T6 \leq 6$ is satisfied.

In the optical imaging lens set of six lens elements of the present invention, the relationship $G23/G12 \leq 5.5$ is satisfied.

In the optical imaging lens set of six lens elements of the present invention, the relationship 0.85≤T3/T5 is satisfied.

In the optical imaging lens set of six lens elements of the present invention, the relationship 2.6≤BFL/G23≤10 is satisfied.

In the optical imaging lens set of six lens elements of the present invention, the relationship AAG/G12≤7 is satisfied.

In the optical imaging lens set of six lens elements of the present invention, the relationship 1.9≤EFL/T5 is satisfied.

In the optical imaging lens set of six lens elements of the present invention, the relationship ALT/G12≤13.6 is satisfied.

In the optical imaging lens set of six lens elements of the present invention, the relationship AAG/T6≤2.9 is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 17 illustrates a ninth example of the optical imaging lens set of six lens elements of the present invention.

FIG. 18A illustrates the longitudinal spherical aberration on the image plane of the ninth example.

FIG. 18B illustrates the astigmatic aberration on the sagittal direction of the ninth example.

FIG. 18C illustrates the astigmatic aberration on the tangential direction of the ninth example.

FIG. 18D illustrates the distortion aberration of the ninth example.

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows the optical data of the eighth example of the optical imaging lens set.

FIG. 37 shows the aspheric surface data of the eighth example.

FIG. 38 shows the optical data of the ninth example of the optical imaging lens set.

FIG. 39 shows the aspheric surface data of the ninth example.

FIG. 40 shows some important ratios in the examples.

DETAILED DESCRIPTION

Figure 19:
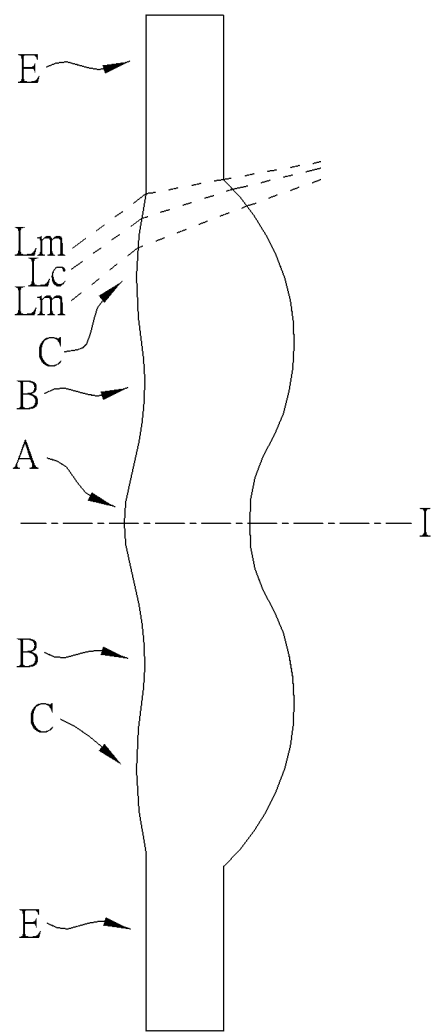
FIG. 19 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 19 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "An outermost portion of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 19. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11, 13, 15 and 17.

Figure 1:
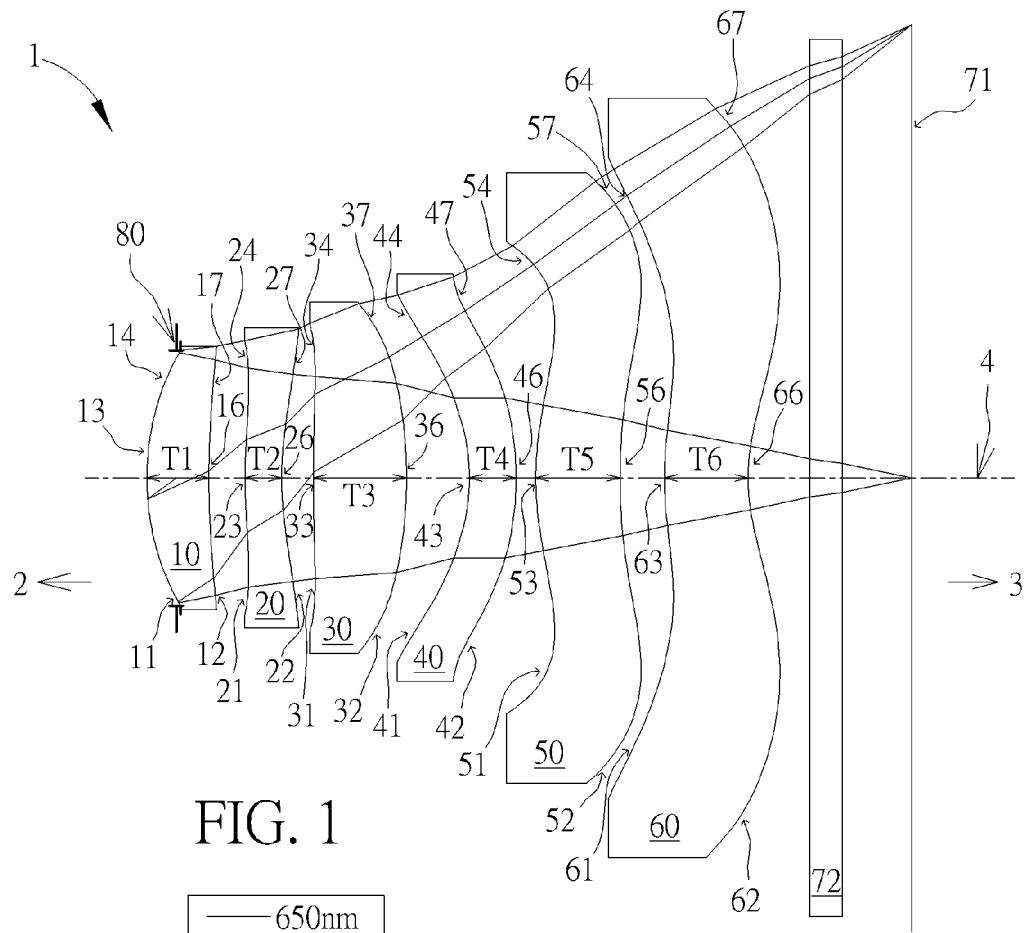
FIG. 1 illustrates a first example of the optical imaging lens set of the present invention.

As shown in FIG. 1, the optical imaging lens set 1 of six lens elements of the present invention, sequentially located from an object side 2 (where an object is located) to an image side 3 along an optical axis 4, has a first lens element 10, a second lens element 20, a third lens element 30, a fourth lens element 40, a fifth lens element 50, a sixth lens element 60, a filter 72 and an image plane 71. Generally speaking, the first lens element 10, the second lens element 20, the third lens element 30, the fourth lens element 40, the fifth lens element 50 and the sixth lens element 60 may be made of a transparent plastic material and each has an appropriate refractive power, but the present invention is not limited to this. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 72.

In the embodiments of the present invention, the optional filter 72 may be a filter of various suitable functions, for example, the filter 72 may be an infrared cut filter (IR cut filter), placed between the sixth lens element 60 and the image plane 71. The filter 72 is made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; and the sixth lens element 60 has a sixth object-side surface 61 and a sixth image-side surface 62. In addition, each object-side surface and image-side surface in the optical imaging lens set 1 of the present invention has a part in an outermost portion (away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, and the sixth lens element 60 has a sixth lens element thickness T6. Therefore, the total thickness of all the lens elements in the optical imaging lens set 1 along the optical axis 4 is ALT, ALT=T1+T2+T3+T4+T5+T6.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, an air gap G34 is disposed between the third lens element 30 and the fourth lens element 40, an air gap G45 is disposed between the fourth lens element 40 and the fifth lens element 50, and an air gap G56 is disposed between the fifth lens element 50 and the sixth lens element 60. Therefore, the sum of total five air gaps between adjacent lens elements from the first lens element 10 to the sixth lens element 60 along the optical axis 4 is AAG, AAG=G12+G23+G34+G45+G56.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the sixth image-side surface 62 of the six lens element 60 to the image plane 71 along the optical axis 4 is BFL; the distance between the sixth image-side surface 62 of the six lens element 60 to the filter 72 along the optical axis 4 is T6R; the thickness of the filter 72 along the optical axis 4 is TF; the distance between the filter 72 to the image plane 71 along the optical axis 4 is TFP; Therefore, BFL=T6R+TF+TFP.

First Example

Figures 2A, 2B, 2C, 2D:
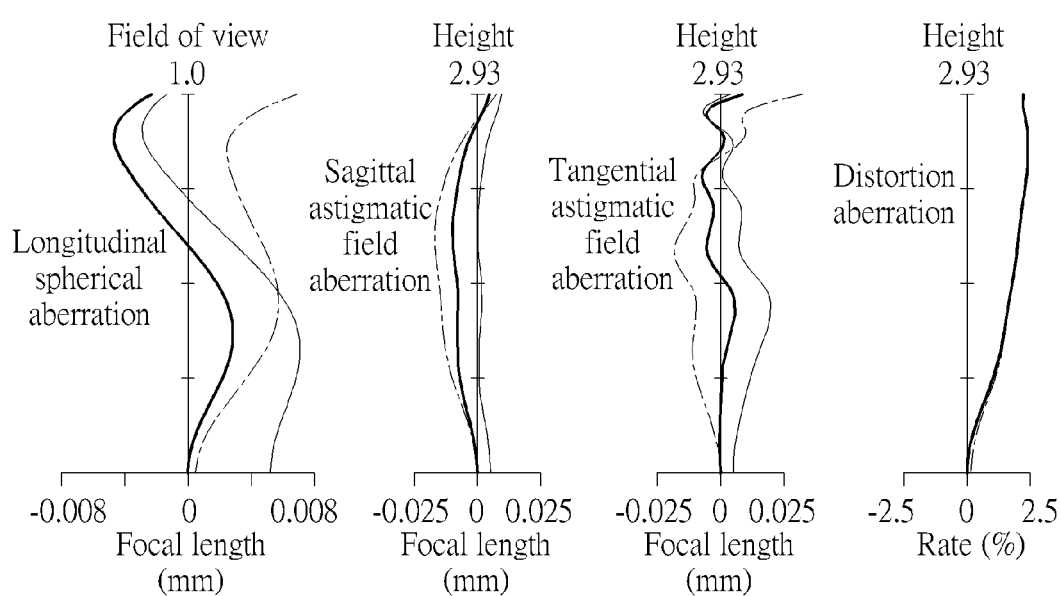
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 2.93 mm.

The optical imaging lens set 1 of the first example has six lens elements 10 to 60 are made of a plastic material and have refractive power. The optical imaging lens set 1 also has an aperture stop 80, a filter 72, and an image plane 71. The aperture stop 80 is provided between the object side 2 and the first lens element 10. The filter 72 may be used for preventing specific wavelength light (such as the infrared light) reaching the image plane to adversely affect the imaging quality.

The first lens element 10 has positive refractive power. The first object-side surface 11 facing toward the object side 2 is a convex surface, having a convex part 13 in the vicinity of the optical axis and a convex part 14 in an outermost portion; The first image-side surface 12 facing toward the image side 3 is a concave surface, having a concave part 16 in the vicinity of the optical axis and a concave part 17 in an outermost portion. Both the first object-side surface 11 and the first image-side 12 of the first lens element 10 are aspherical surfaces.

The second lens element 20 has negative refractive power. The second object-side surface 21 facing toward the object side 2 has a convex part 23 in the vicinity of the optical axis and a concave part 24 in an outermost portion; The second image-side surface 22 facing toward the image side 3 is a concave surface, having a concave part 26 in the vicinity of the optical axis and a concave part 27 in an outermost portion. Both the second object-side surface 21 and the second image-side 22 of the second lens element 20 are aspherical surfaces.

The third lens element 30 has positive refractive power. The third object-side surface 31 facing toward the object side 2 has a convex part 33 in the vicinity of the optical axis and a concave part 34 in an outermost portion; The third image-side surface 32 facing toward the image side 3 is a convex surface, having a convex part 36 in the vicinity of the optical axis and a convex part 37 in an outermost portion. Both the third object-side surface 31 and the third image-side 32 of the third lens element 30 are aspherical surfaces.

The fourth lens element 40 has negative refractive power. The fourth object-side surface 41 facing toward the object side 2 is a concave surface, having a concave part 43 in the vicinity of the optical axis and a concave part 44 in an outermost portion; The fourth image-side surface 42 facing toward the image side 3 is a convex surface, having a convex part 46 in the vicinity of the optical axis and a convex part 47 in an outermost portion. Both the fourth object-side surface 41 and the fourth image-side 42 of the fourth lens element 40 are aspherical surfaces.

The fifth lens element 50 has positive refractive power. The fifth object-side surface 51 facing toward the object side 2 has a convex part 53 in the vicinity of the optical axis and a concave part 54 in an outermost portion; The fifth image-side surface 52 facing toward the image side 3 has a concave part 56 in the vicinity of the optical axis and a convex part 57 in an outermost portion. Both the fifth object-side surface 51 and the fifth image-side 52 of the fifth lens element 50 are aspherical surfaces.

The sixth lens element 60 has negative refractive power. The sixth object-side surface 61 facing toward the object side 2 has a convex part 63 in the vicinity of the optical axis and a concave part 64 in an outermost portion; The sixth image-side surface 62 facing toward the image side 3 has a concave part 66 in the vicinity of the optical axis and a convex part 67 in an outermost portion. Both the sixth object-side surface 61 and the sixth image-side 62 of the sixth lens element 60 are aspherical surfaces. The filter 72 may be disposed between the sixth lens element 60 and the image plane 71.

In the optical imaging lens element 1 of the present invention, all of the object-side surfaces 11/21/31/41/51/61 and image-side surfaces 12/22/32/42/52/62 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and $a_{2i}$ is the aspheric coefficient of the 2i order.

The optical data of the first example of the optical imaging lens set 1 are shown in FIG. 22 while the aspheric surface data are shown in FIG. 23. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.942 mm. The image height is 2.93 mm, HFOV is 36.42 degrees. Some important ratios of the first example are as follows:

EFL=3.85
AAG=1.261
ALT=2.625
BFL=1.057
TTL=4.943
T1/T6=0.741
BFL/G56=3.683
EFL/G23=18.780
AAG/G12=5.389
BFL/T5=1.943
T6/G23=2.639
T5/T6=1.006
T1/G12=1.714
G56/G12=1.226
T3/T4=2.000
ALT/T6=4.852
G23/G12=0.876
T3/T5=1.107
BFL/G23=5.156
AAG/G12=5.389
EFL/T5=7.077
ALT/G12=11.218
AAG/T6=2.331

Second Example

Figure 3:
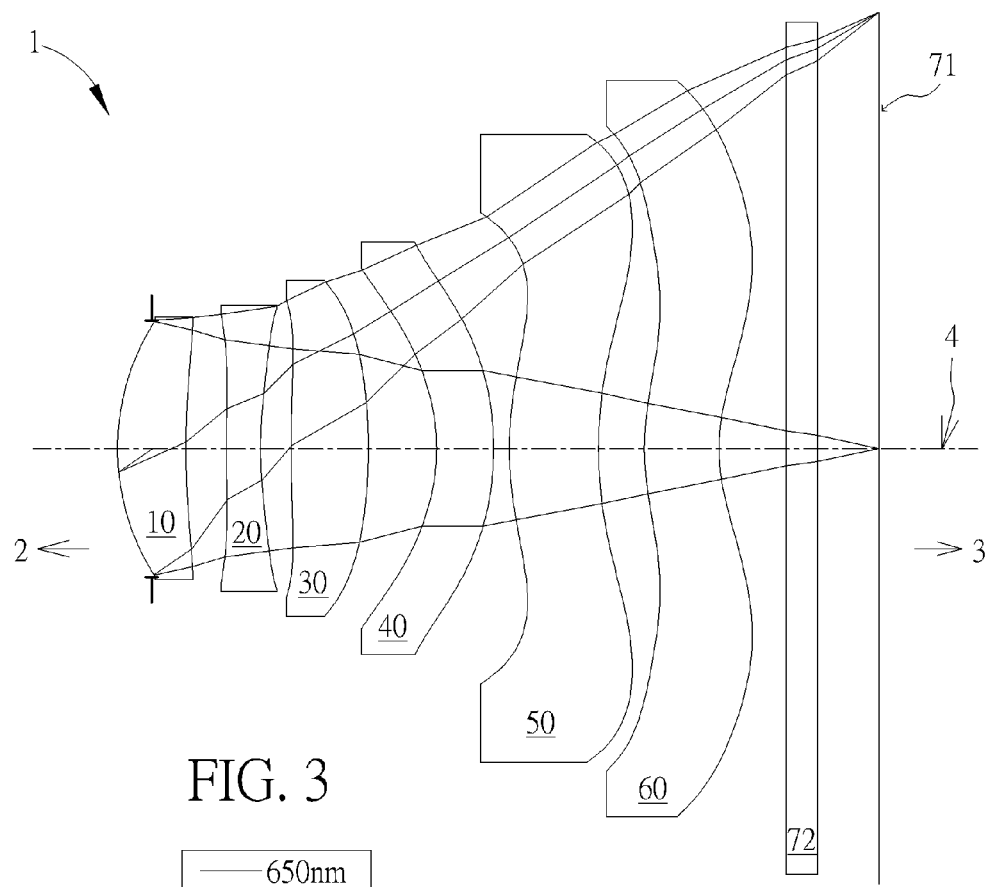
FIG. 3 illustrates a second example of the optical imaging lens set of six lens elements of the present invention.
Figures 4A, 4B, 4C, 4D:
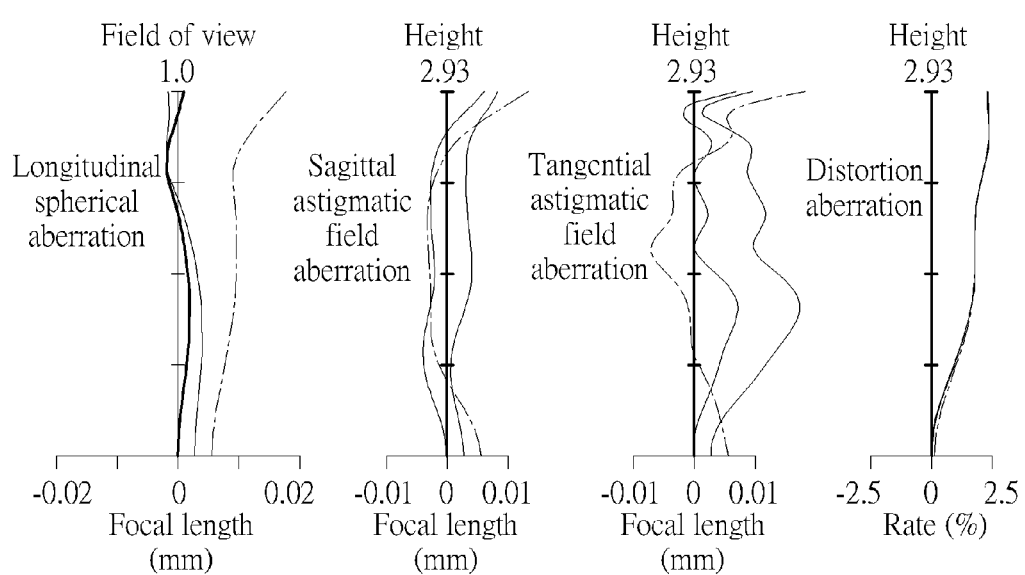
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. It is noted that from the second example to the following examples, in order to simplify the figures, only the components different from what the first example has and the basic lens elements will be labeled in figures. Others components that are the same as what the first example has, such as the object-side surface, the image-side surface, the part in a vicinity of the optical axis and the part in an outermost portion will be omitted in the following example. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 24 while the aspheric surface data are shown in FIG. 25. The length of the optical imaging lens set is 5.111 mm. The image height is 2.93 mm, HFOV is 35.00 degrees. Some important ratios of the second example are as follows:

EFL=4.052
AAG=1.347
ALT=2.69
BFL=1.073
TTL=5.11
T1/T6=0.916
BFL/G56=3.484
EFL/G23=19.863
AAG/G12=4.970
BFL/T5=1.791
T6/G23=2.456
T5/T6=1.196
T1/G12=1.694
G56/G12=1.137
T3/T4=1.359
ALT/T6=5.369
G23/G12=0.753
T3/T5=0.866
BFL/G23=5.260
AAG/G12=4.970
EFL/T5=6.765
ALT/G12=9.926
AAG/T6=2.689

Third Example

Figure 5:
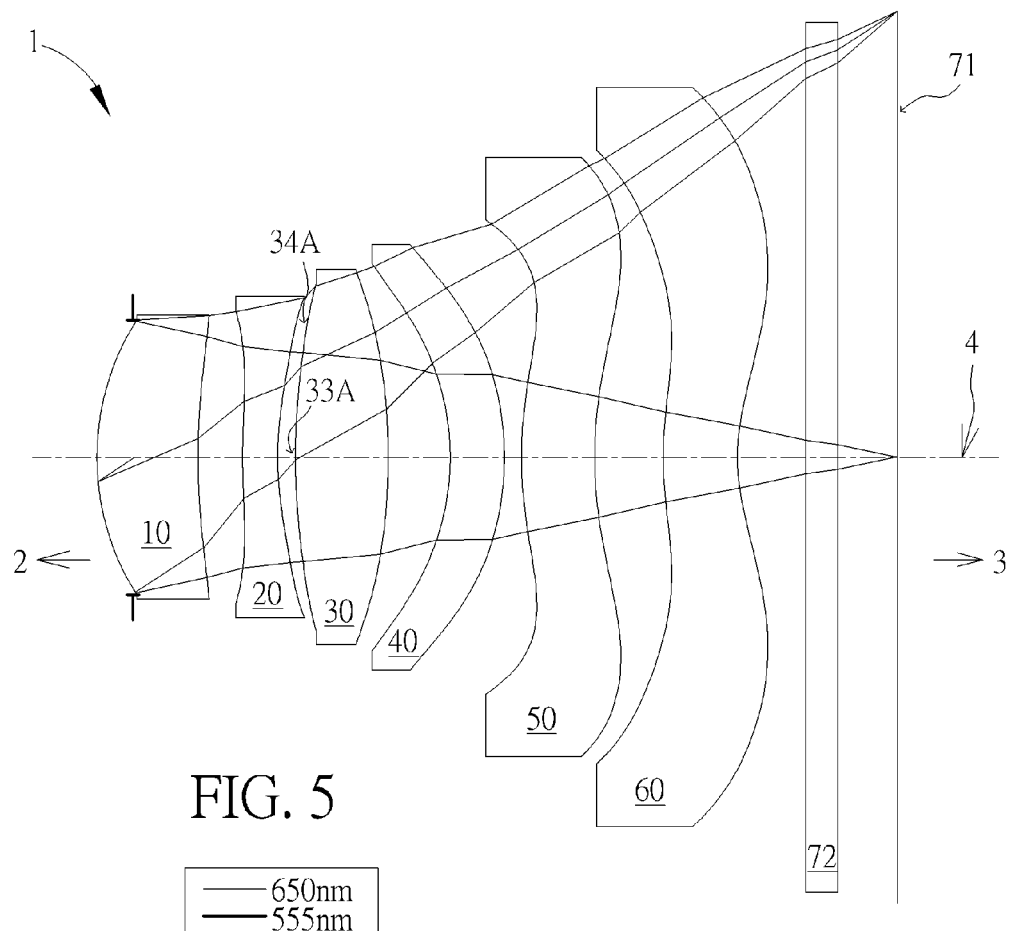
FIG. 5 illustrates a third example of the optical imaging lens set of six lens elements of the present invention.
Figures 6A, 6B, 6C, 6D:
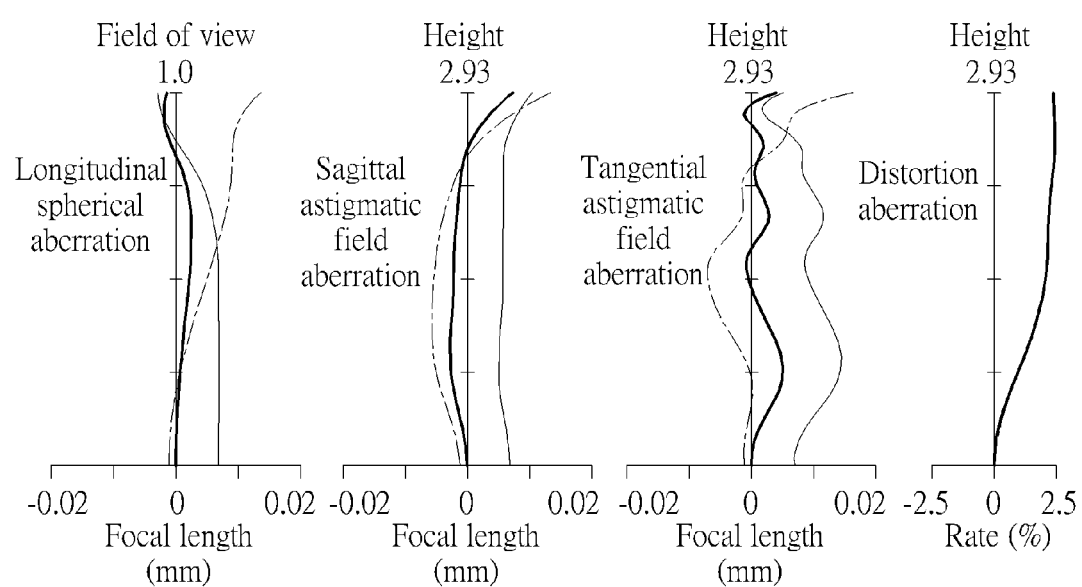
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33A in the vicinity of the optical axis and a convex part 34A in an outermost portion. The optical data of the third example of the optical imaging lens set are shown in FIG. 26 while the aspheric surface data are shown in FIG. 27. The length of the optical imaging lens set is 5.255 mm. The image height is 2.93 mm, HFOV is 33.75 degrees. Some important ratios of the third example are as follows:

EFL=4.239
AAG=1.379
ALT=2.827
BFL=1.05
TTL=5.256
T1/T6=1.359
BFL/G56=2.339
EFL/G23=36.231
AAG/G12=4.706
BFL/T5=2.178
T6/G23=4.171
T5/T6=0.988
T1/G12=2.263
G56/G12=1.532
T3/T4=1.715
ALT/T6=5.793
G23/G12=0.399

T3/T5=1.263
BFL/G23=8.974
AAG/G12=4.706
EFL/T5=8.795
ALT/G12=9.648
AAG/T6=2.826

Fourth Example

Figure 7:
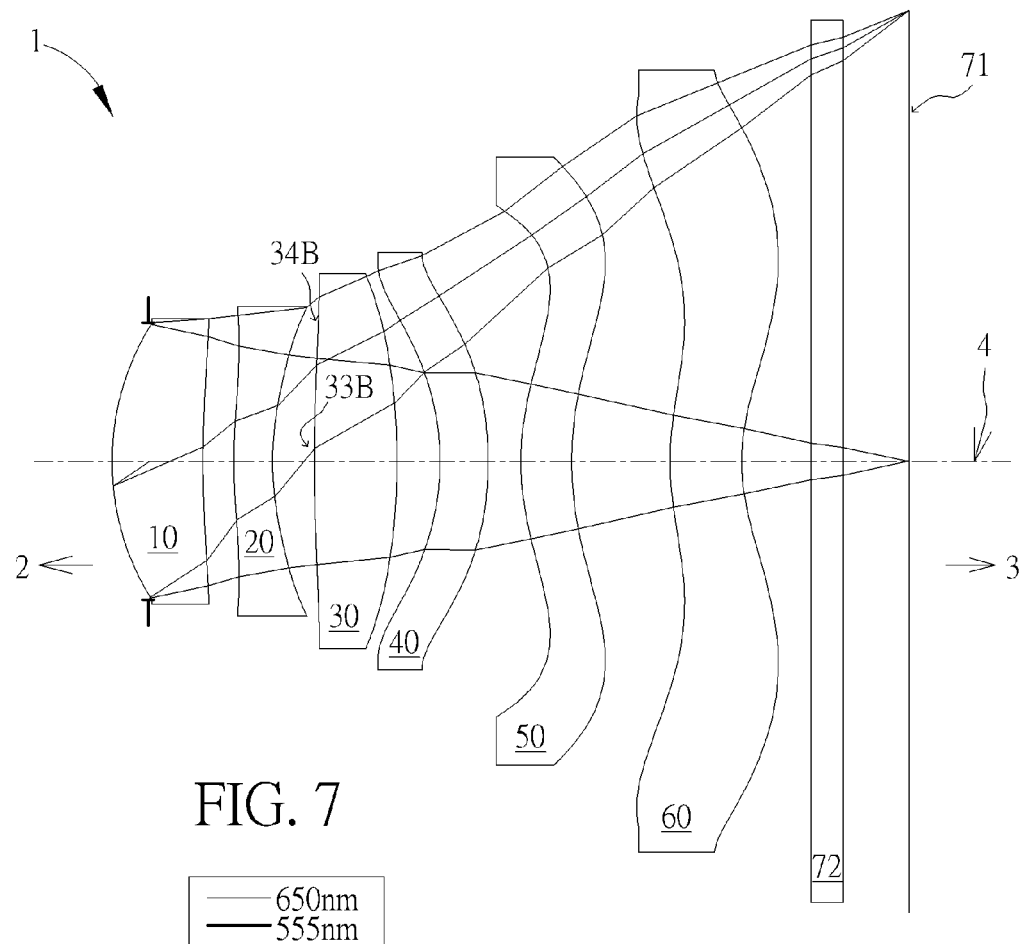
FIG. 7 illustrates a fourth example of the optical imaging lens set of six lens elements of the present invention.
Figures 8A, 8B, 8C, 8D:
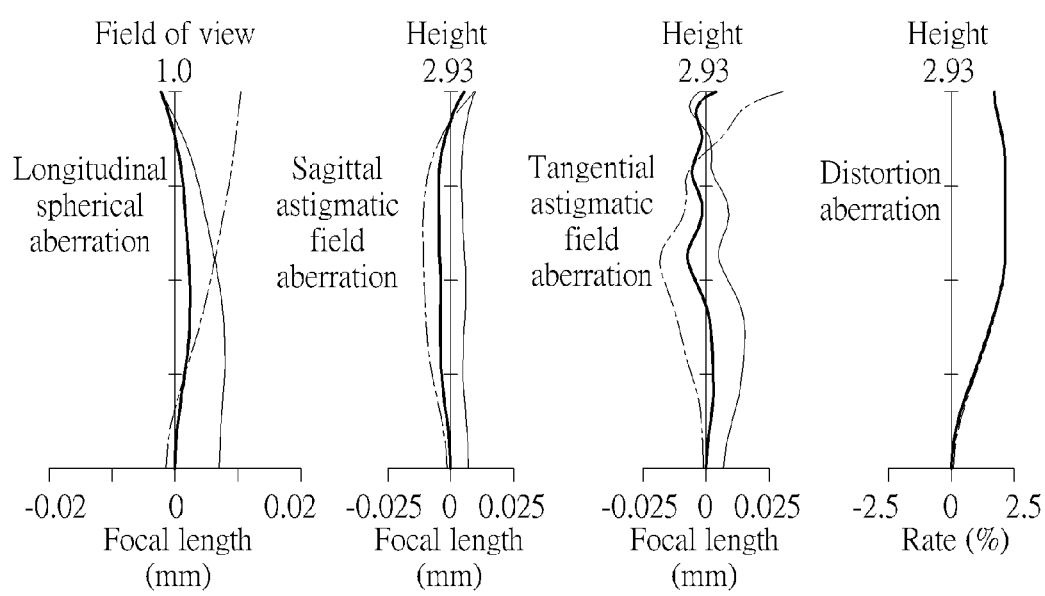
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33B in the vicinity of the optical axis and a convex part 34B in an outermost portion. The optical data of the fourth example of the optical imaging lens set are shown in FIG. 28 while the aspheric surface data are shown in FIG. 29. The length of the optical imaging lens set is 5.175 mm. The image height is 2.93 mm, HFOV is 34.00 degrees. Some important ratios of the fourth example are as follows:
EFL=4.228
AAG=1.604
ALT=2.486
BFL=1.087
TTL=5.177
T1/T6=1.269
BFL/G56=1.698
EFL/G23=15.601
AAG/G12=8.020
BFL/T5=3.294
T6/G23=1.716
T5/T6=0.710
T1/G12=2.950
G56/G12=3.200
T3/T4=1.721
ALT/T6=5.346
G23/G12=1.355
T3/T5=1.627
BFL/G23=4.011
AAG/G12=8.020
EFL/T5=12.812
ALT/G12=12.430
AAG/T6=3.449

Fifth Example

Figure 9:
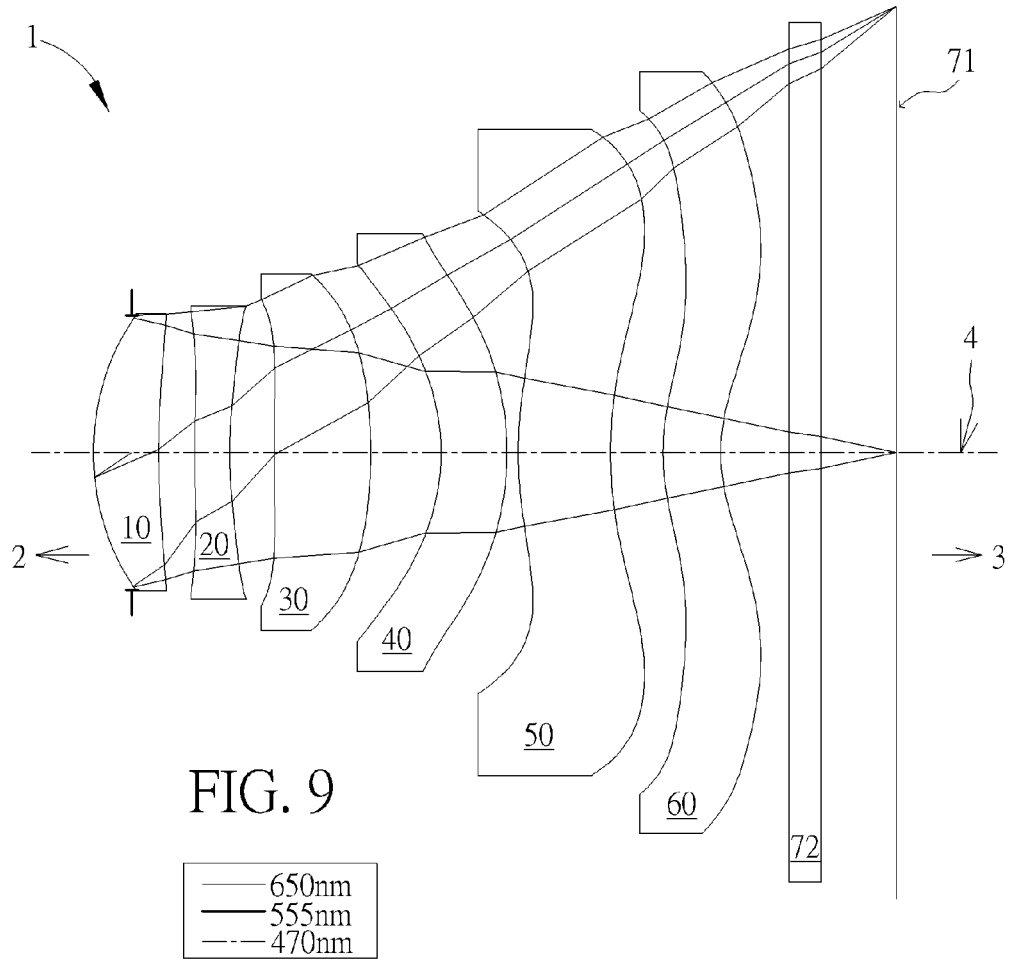
FIG. 9 illustrates a fifth example of the optical imaging lens set of six lens elements of the present invention.
Figures 10A, 10B, 10C, 10D:
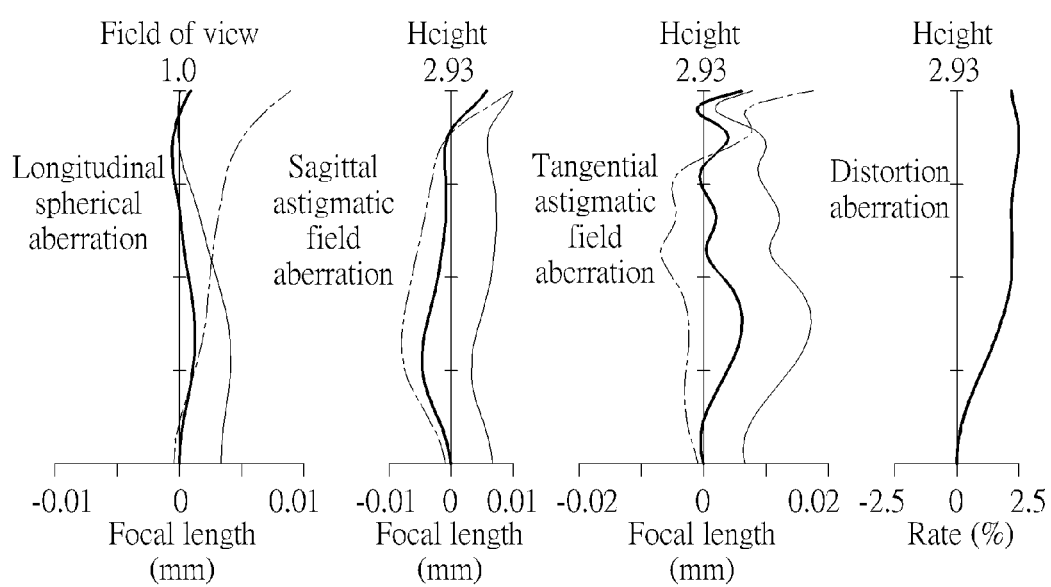
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example. The optical data of the fifth example of the optical imaging lens set are shown in FIG. 30 while the aspheric surface data are shown in FIG. 31. The length of the optical imaging lens set is 5.271 mm. The image height is 2.93 mm, HFOV is 34.00 degrees. Some important ratios of the fifth example are as follows:
EFL=4.209
AAG=1.41
ALT=2.709
BFL=1.152
TTL=5.271
T1/T6=1.126
BFL/G56=3.339
EFL/G23=14.414
AAG/G12=5.975
BFL/T5=1.904
T6/G23=1.301
T5/T6=1.592
T1/G12=1.814
G56/G12=1.462
T3/T4=1.473
ALT/T6=7.129
G23/G12=1.237
T3/T5=1.050
BFL/G23=3.945
AAG/G12=5.975
EFL/T5=6.957
ALT/G12=11.479
AAG/T6=3.711

Sixth Example

Figure 11:
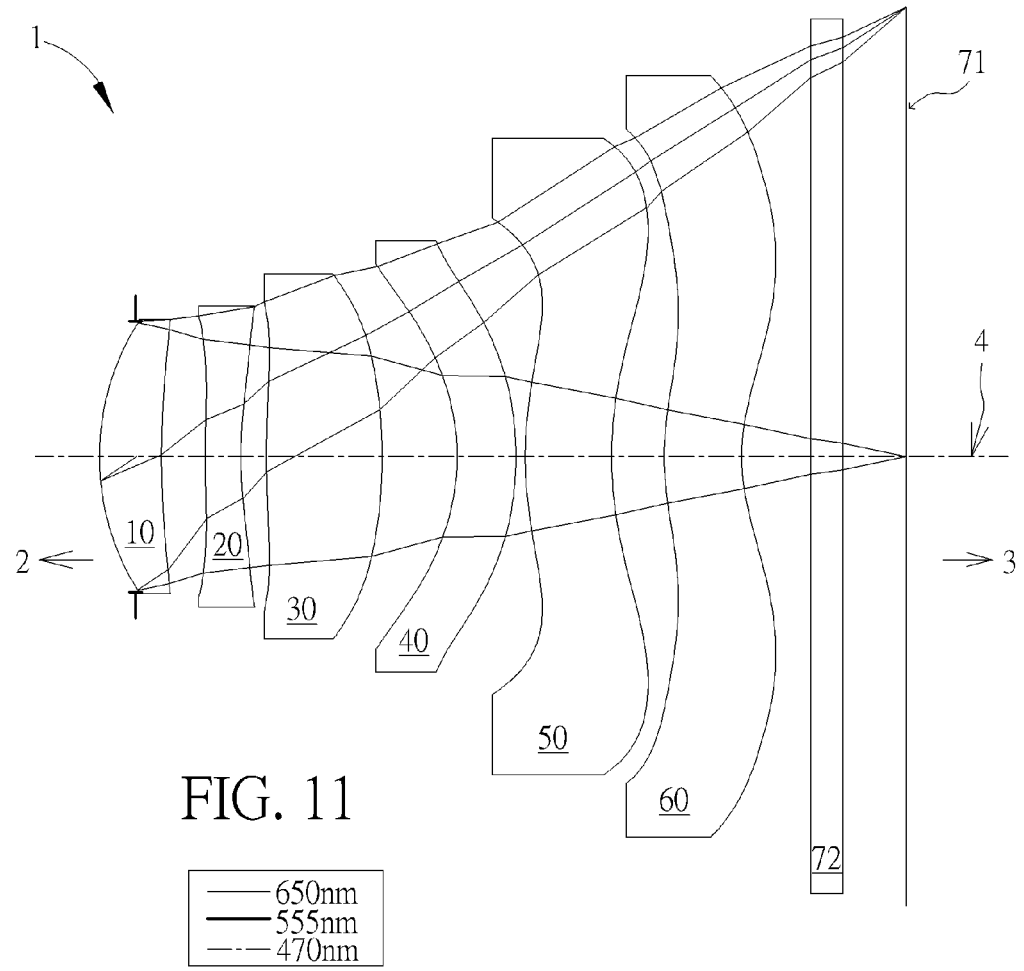
FIG. 11 illustrates a sixth example of the optical imaging lens set of six lens elements of the present invention.
Figures 12A, 12B, 12C, 12D:
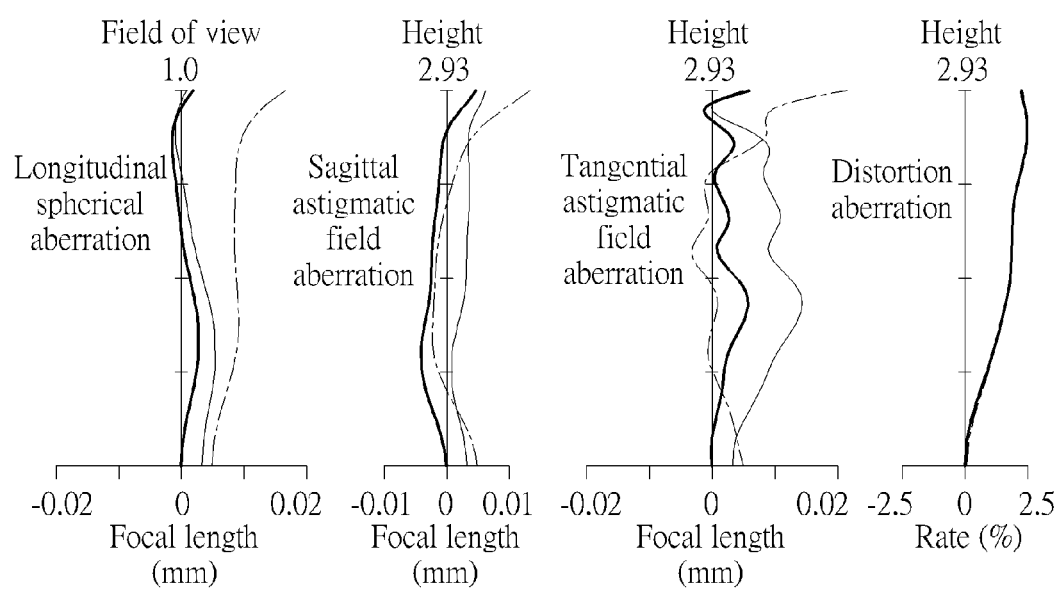
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example. The optical data of the sixth example of the optical imaging lens set are shown in FIG. 32 while the aspheric surface data are shown in FIG. 33. The length of the optical imaging lens set is 5.258 mm. The image height is 2.93 mm, HFOV is 34.33 degrees. Some important ratios of the sixth example are as follows:
EFL=4.154
AAG=1.343
ALT=2.841
BFL=1.074
TTL=5.258
T1/T6=0.800
BFL/G56=3.150
EFL/G23=24.726
AAG/G12=4.729
BFL/T5=1.904
T6/G23=3.006
T5/T6=1.117
T1/G12=1.423
G56/G12=1.201

T3/T4=1.963
ALT/T6=5.626
G23/G12=0.592
T3/T5=1.333
BFL/G23=6.393
AAG/G12=4.729
EFL/T5=7.365
ALT/G12=10.004
AAG/T6=2.659

Seventh Example

Figure 13:
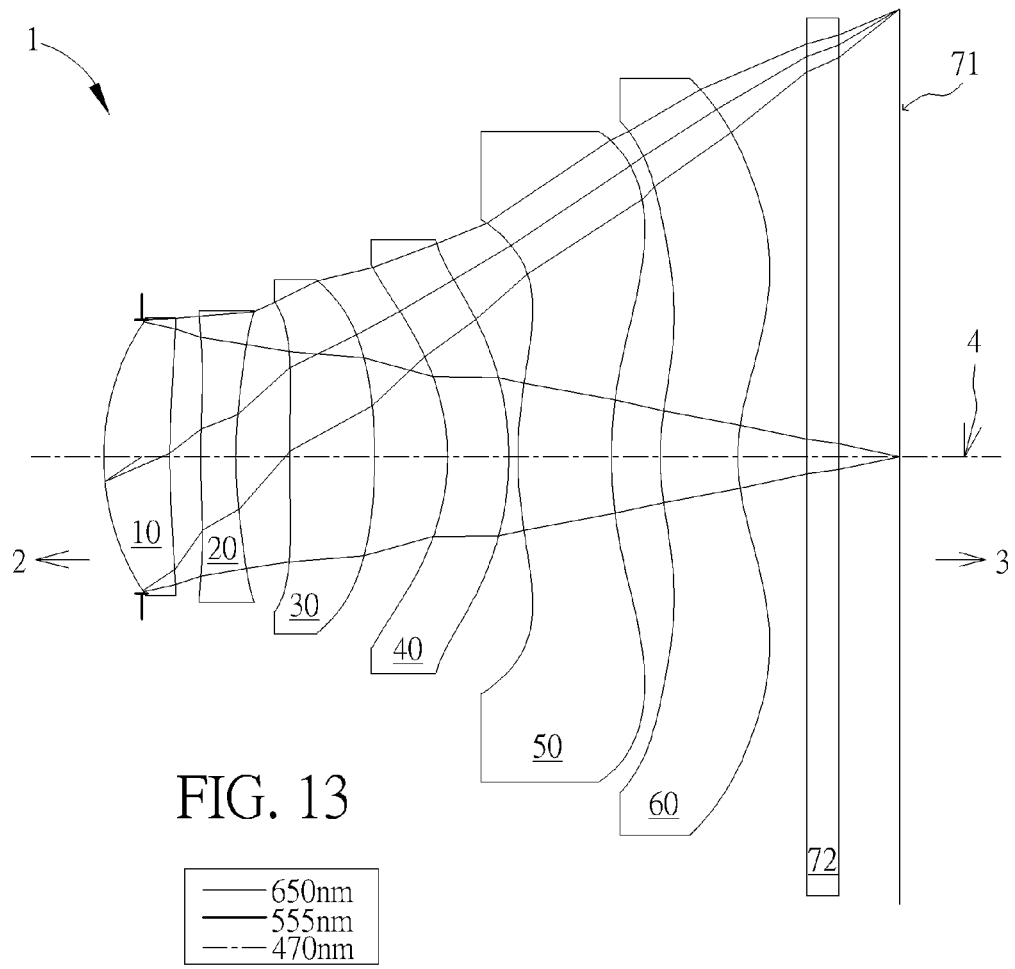
FIG. 13 illustrates a seventh example of the optical imaging lens set of six lens elements of the present invention.
Figures 14A, 14B, 14C, 14D:
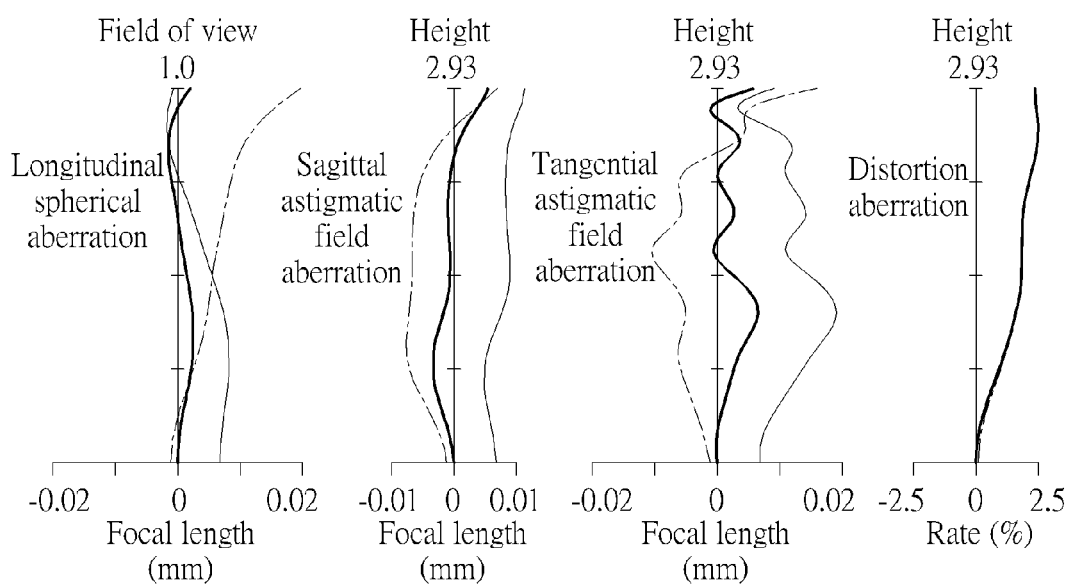
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example. The optical data of the seventh example of the optical imaging lens set are shown in FIG. 34 while the aspheric surface data are shown in FIG. 35. The length of the optical imaging lens set is 5.206 mm. The image height is 2.93 mm, HFOV is 34.00 degrees. Some important ratios of the seventh example are as follows:
EFL=4.199
AAG=1.409
ALT=2.739
BFL=1.059
TTL=5.207
T1/T6=0.854
BFL/G56=3.330
EFL/G23=11.895
AAG/G12=6.975
BFL/T5=1.725
T6/G23=1.436
T5/T6=1.211
T1/G12=2.144
G56/G12=1.574
T3/T4=1.388
ALT/T6=5.402
G23/G12=1.748
T3/T5=0.904
BFL/G23=3.000
AAG/G12=6.975
EFL/T5=6.839
ALT/G12=13.559
AAG/T6=2.779

Eighth Example

Figure 15:
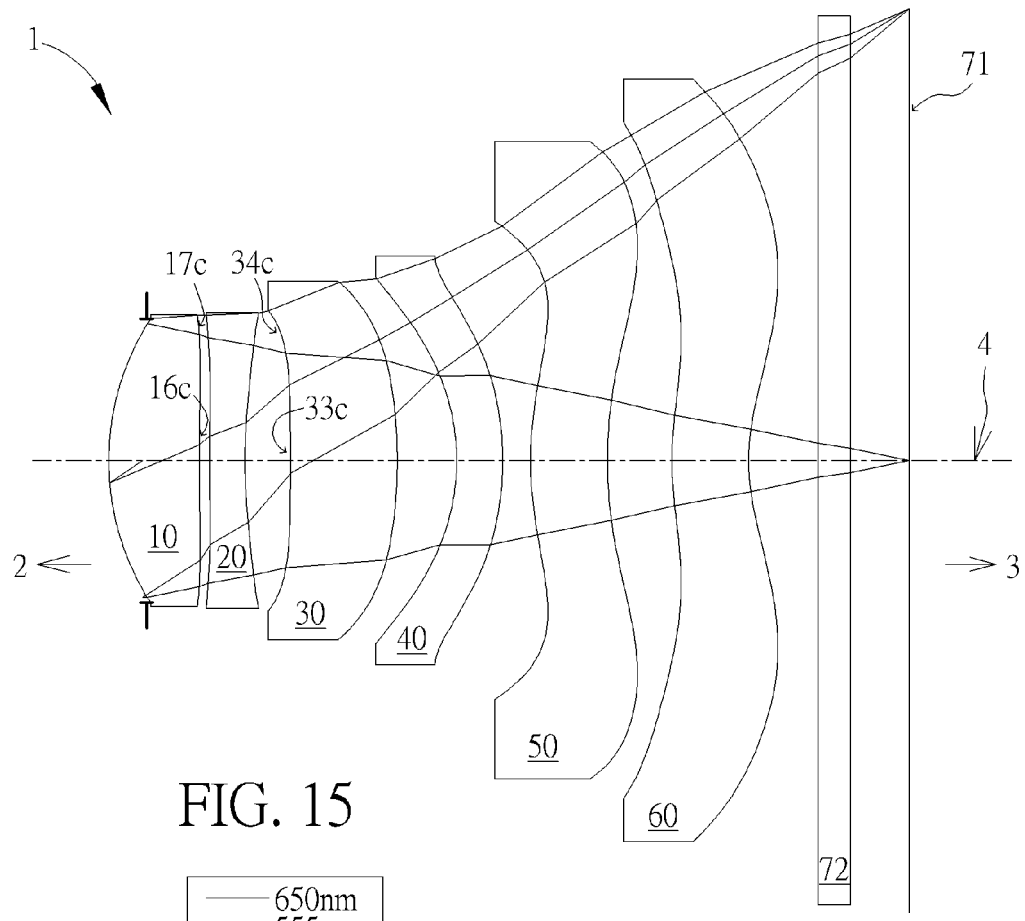
FIG. 15 illustrates an eighth example of the optical imaging lens set of six lens elements of the present invention.
Figures 16A, 16B, 16C, 16D:
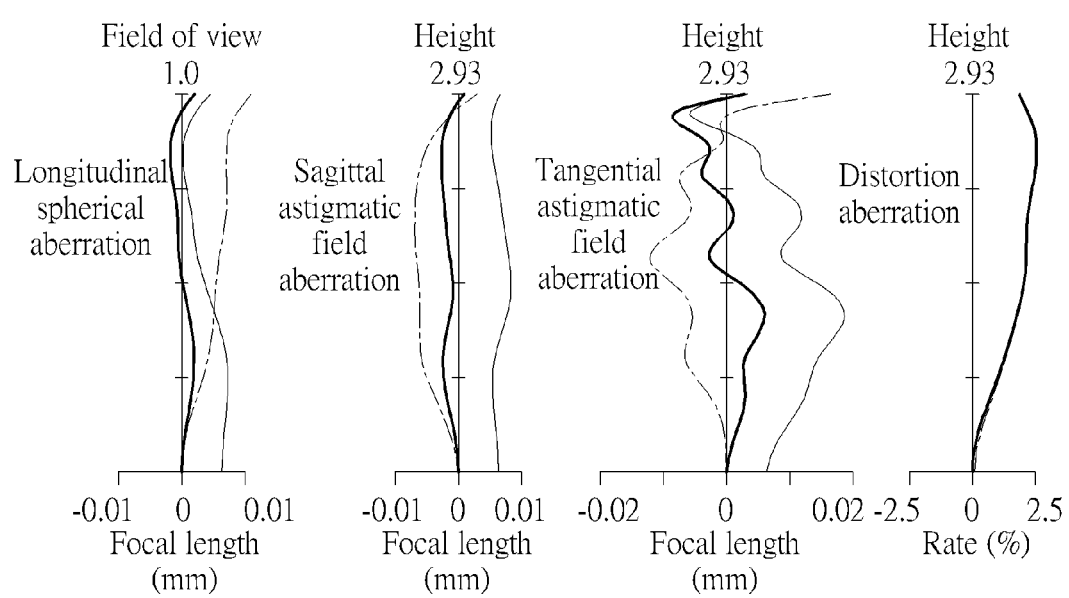
FIG. 16A illustrates the longitudinal spherical aberration on the image plane of the eighth example.
FIG. 16B illustrates the astigmatic aberration on the sagittal direction of the eighth example.
FIG. 16C illustrates the astigmatic aberration on the tangential direction of the eighth example.
FIG. 16D illustrates the distortion aberration of the eighth example.

Please refer to FIG. 15 which illustrates the eighth example of the optical imaging lens set 1 of the present invention. Please refer to FIG. 16A for the longitudinal spherical aberration on the image plane 71 of the eighth example; please refer to FIG. 16B for the astigmatic aberration on the sagittal direction; please refer to FIG. 16C for the astigmatic aberration on the tangential direction, and please refer to FIG. 16D for the distortion aberration. The components in the eighth example are similar with those in the first example, but the optical data in this example are different from the optical data in the first example, and in this example, the first image-side surface 12 of the first lens element 10 has a concave part 16C in the vicinity of the optical axis and a convex part 17C in an outermost portion, the third object-side surface 31 of the third lens element 30 is a concave surface, having a concave part 33C in the vicinity of the optical axis and a concave part 34C in an outermost portion. The optical data of the eighth example of the optical imaging lens set are shown in FIG. 36 while the aspheric surface data are shown in FIG. 37. The length of the optical imaging lens set is 5.184 mm. The image height is 2.93 mm, HFOV is 34.00 degrees. Some important ratios of the second example are as follows:
EFL=4.219
AAG=1.345
ALT=2.799
BFL=1.04
TTL=5.184
T1/T6=1.179
BFL/G56=2.488
EFL/G23=14.302
AAG/G12=20.379
BFL/T5=2.088
T6/G23=1.681
T5/T6=1.004
T1/G12=8.864
G56/G12=6.333
T3/T4=2.322
ALT/T6=5.643
G23/G12=4.470
T3/T5=1.390
BFL/G23=3.525
AAG/G12=20.379
EFL/T5=8.472
ALT/G12=42.409
AAG/T6=2.712

Ninth Example

Please refer to FIG. 17 which illustrates the ninth example of the optical imaging lens set 1 of the present invention. Please refer to FIG. 18A for the longitudinal spherical aberration on the image plane 71 of the ninth example; please refer to FIG. 18B for the astigmatic aberration on the sagittal direction; please refer to FIG. 18C for the astigmatic aberration on the tangential direction, and please refer to FIG. 18D for the distortion aberration. The components in the ninth example are similar with those in the first example, but the optical data in this example are different from the optical data in the first example. The optical data of the ninth example of the optical imaging lens set are shown in FIG. 38 while the aspheric surface data are shown in FIG. 39. The length of the optical imaging lens set is 5.503 mm. The image height is 2.93 mm, HFOV is 34.00 degrees. Some important ratios of the second example are as follows:
EFL=4.395
AAG=0.852
ALT=3.583
BFL=1.068
TTL=5.503
T1/T6=1.503
BFL/G56=10.680
EFL/G23=26.161
AAG/G12=3.000
BFL/T5=0.607
T6/G23=1.786
T5/T6=5.863

T1/G12=1.588
G56/G12=0.352
T3/T4=1.968
ALT/T6=11.943
G23/G12=0.592
T3/T5=0.318
BFL/G23=6.357
AAG/G12=3.000
EFL/T5=2.499
ALT/G12=12.616
AAG/T6=2.840

Some important ratios in each example are shown in FIG. 40.

In the light of the above examples, the inventors observe the following features:

1. The first lens element has positive refractive power, to provide the needed refractive power for the optical imaging lens set.

2. The second object-side surface of the second lens element has a concave part in an outermost portion, the second image-side surface of the second lens element has a concave part in an outermost portion, the fourth image-side surface of the fourth lens element has a convex part in a vicinity of the optical axis, the fifth object-side surface of the fifth lens element has a convex part in a vicinity of the optical axis, the fifth image-side surface of the fifth lens element has a concave part in a vicinity of the optical axis, and the sixth image-side surface of the sixth lens element has a convex part in an outermost portion, where each of the surfaces match each other, in order to improve the aberration.

3. The sixth lens element is made of plastic, helping to decrease the manufacturing cost and lightened the weight.

In addition, the inventors discover that there are some better ratio ranges for different data according to the above various important ratios. Better ratio ranges help the designers to design the better optical performance and an effectively reduced length of a practically possible optical imaging lens set. For example:

(1) T1/T6≤1.4, ALT/T6≤6.0, T5/T6≤1.22, AAG/T6≤2.9:

The sixth lens element 60 has a larger optical effective aperture, therefore, it can be designed thicker for easier production, while the first lens element 10 has a smaller optical effective aperture in the optical imaging lens set. Considering the fabricating feasibility, T1 shortens more than T6 does. In addition, ALT and AAG occupy higher proportion of the total length of the optical imaging lens set, so that ALT and AAG can shorten more than other parameters do in order to help the total length of the optical imaging lens set shrinking. Besides, the fifth lens element is a convex-concave lens along the optical axis, so it can be thinner than the sixth lens element, so T1/T6, ALT/T6, T5/T6, AAG/T6 are preferably small. Moreover, if the relationship T1/T6≤1.4 is satisfied, it is suggested that the range may preferably be 0.3~1.4; if the relationship ALT/T6≤6.0 is satisfied, it is suggested that the range may preferably be 4.0~6.0; if the relationship T5/T6≤1.22 is satisfied, it is suggested that the range may preferably be 0.3~1.22; if the relationship AAG/T6≤2.9 is satisfied, it is suggested that the range may preferably be 1.9~2.9.

(2) BFL/T5≥1.9, EFL/T5≥1.9, T3/T5≥0.85:

In order to reduce the total length of the optical imaging lens set, BFL and EFL should preferably small, and the third lens element should preferably thinner too. However, since the fifth lens element is a convex-concave lens along the optical axis, it can be shortened more than EFL, BFL and T3 are. Therefore, BFL/T5, EFL/T5 and T3/T5 are preferably large. Moreover, if the relationship BFL/T5≥1.9 is satisfied, it is suggested that the range may preferably be 1.9~4.0; if the relationship EFL/T5≥1.9 is satisfied, it is suggested that the range may preferably be 1.9~14.0; if the relationship T3/T5≥0.85 is satisfied, it is suggested that the range may preferably be 0.85~2.0.

(3) BFL/G56≥2.0:

Since the filter and others components should be disposed between the sixth lens element and the image plane, so that BFL cannot be shrunk unlimitedly. But G56 is not limited by it, so that BFL can be shortened less than G56 is. BFL/G56 is preferably large. Moreover, if the relationship BFL/G56≥2.0 is satisfied, it is suggested that the range may preferably be 2.0~11.0.

(4) 2.6≤BFL/G23≤10.0, 10.5≤EFL/G23≤30.0, 1.0≤T6/G23≤3.5, T3/T4≥1.1:

The thickness of lens element and the air gaps between adjacent lens elements will influence the focal length, and the focal length will influence the BFL. When the relationships mentioned are satisfied, each lens element has a better configuration and can avoid the total length being too long while feasible in manufacturing process. If the relationship T3/T4≥1.1 is satisfied, it is suggested that the range may preferably be 1.1~3.0.

(5) AAG/G12≤9.0, T1/G12≤3.0, G56/G12≤4.0, G23/G12≤5.5, ALT/G12≤13.6:

With the first lens element with positive refractive power, the incident light will be focused after passing through the first lens element. Besides, since both the edges of the object-side surface and the image-side surface of the second lens element are concave, considering a suitable incident height of light entering the second lens element, and feasibility for assembly to render a preferred configuration in the process of shortening the optical imaging lens set, G12 should be maintained with a relatively large value, and G12 can shorten less than others parameters do. Therefore, AAG/G12, T1/G12, G56/G12, G23/G12 and ALT/G12 should preferably small. Moreover, if the relationship AAG/G12≤9.0 is satisfied, it is suggested that the range may preferably be 2.0~9.0, more preferably, AAG/G12 may be smaller than or equal to 7.0, that will has a better configuration for other parameters when AAG is designed smaller; if the relationship T1/G12≤3.0 is satisfied, it is suggested that the range may preferably be 1.0~3.0; if the relationship G56/G12≤4.0 is satisfied, it is suggested that the range may preferably be 0.05~4.0; if the relationship G23/G12≤5.5 is satisfied, it is suggested that the range may preferably be 0.05~5.5; if the relationship ALT/G12≤13.6 is satisfied, it is suggested that the range may preferably be 8.0~13.6.

Figure 20:
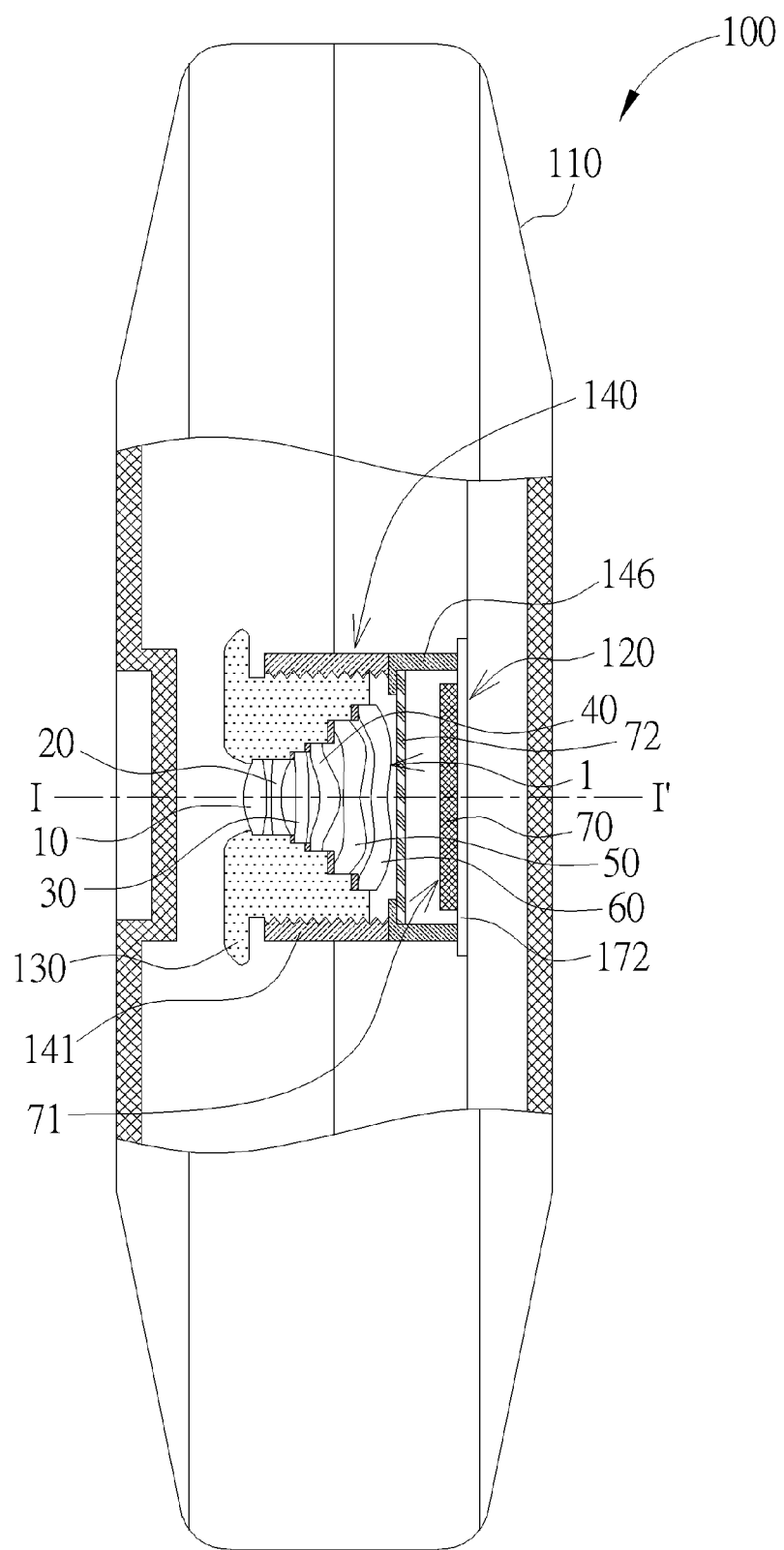
FIG. 20 illustrates a first preferred example of the portable electronic device with an optical imaging lens set of the present invention.

The optical imaging lens set 1 of the present invention may be applied to an electronic device, such as game consoles or driving recorders. Please refer to FIG. 20. FIG. 20 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 16 as an example, but the electronic device 100 is not limited to a driving recorder.

As shown in FIG. 20, the image module 120 includes the optical imaging lens set 1 as described above. FIG. 20 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 21:
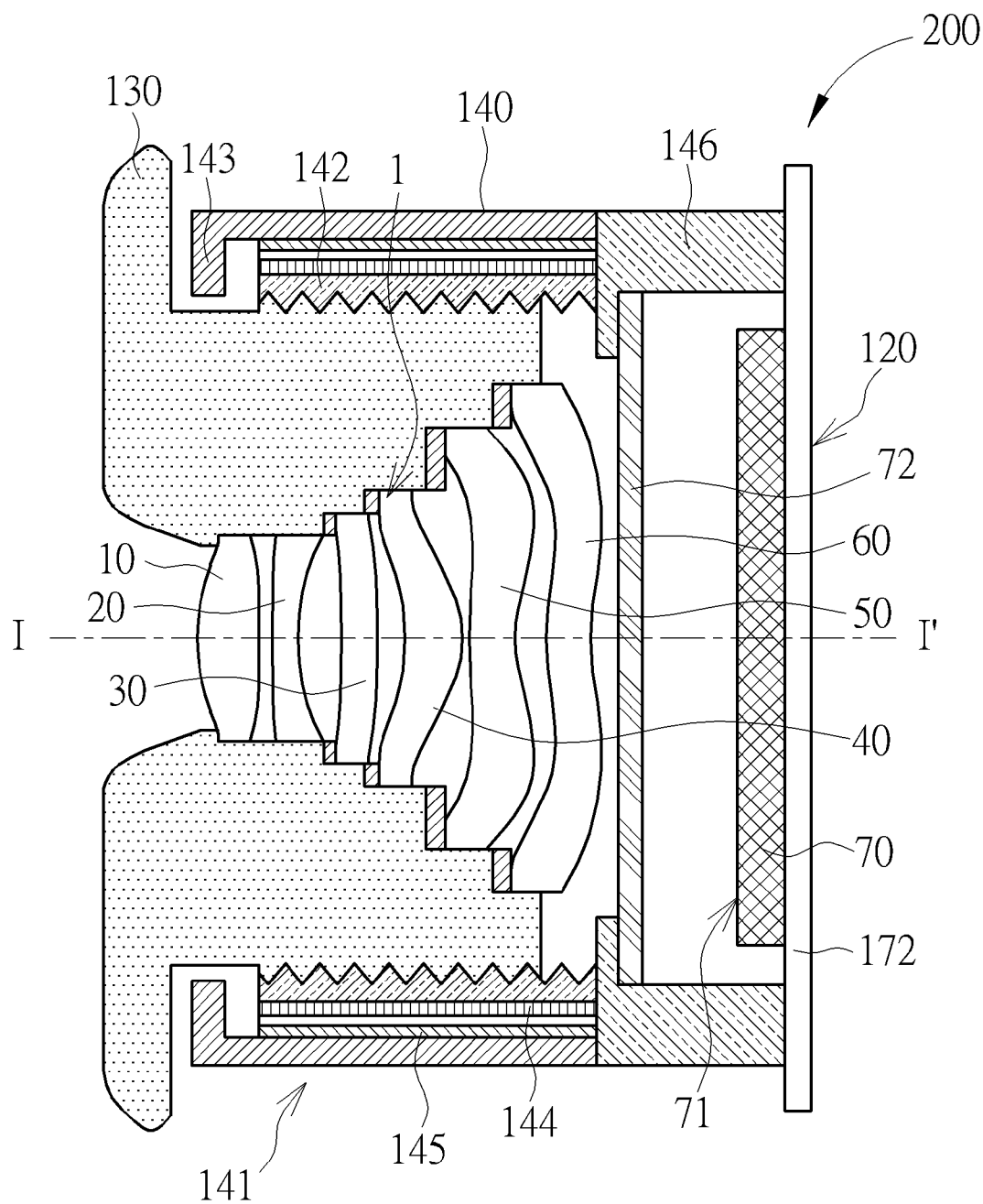
FIG. 21 illustrates a second preferred example of the portable electronic device with an optical imaging lens set of the present invention.

Please also refer to FIG. 21 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, said first to sixth lens elements with refractive power, having an object-side surface facing toward the object side as well as an image-side surface facing toward the image side, wherein:
the first lens element has positive refractive power, and has an image-side surface with a concave part in an outermost portion for an imaging rays passing through;
the second lens element has an object-side surface with a concave part in an outermost portion for the imaging rays passing through, and an image-side surface with a concave part in an outermost portion for the imaging rays passing through;
the fourth lens element has negative refractive power, and has an image-side surface with a convex part in a vicinity of the optical axis, and an image-side surface with a convex part in an outermost portion for the imaging rays passing through;
the fifth lens element has an object-side surface with a convex part in a vicinity of the optical axis, and an image-side surface with a concave part in a vicinity of the optical axis;
the sixth lens element has an image-side surface with a convex part in an outermost portion for the imaging rays passing through, and the sixth lens element being made of plastic; and
the optical imaging lens set does not include any lens element with refractive power other than said first lens element, second lens element, third lens element, fourth lens element, fifth lens element and sixth lens element, in addition, an air gap G23 between said second lens element and said third lens element along said optical axis, the sum of all five air gaps AAG between each lens element from said first lens element to said sixth lens element along the optical axis, and a thickness T6 of said sixth lens element along said optical axis satisfy relationships $AAG/T6 \leq 2.9$ and $1 \leq T6/G23 \leq 3.5$.

2. The optical imaging lens set of claim 1, wherein a thickness T1 of said first lens element along said optical axis further satisfies a relationship $T1/T6 \leq 1.4$.

3. The optical imaging lens set of claim 2, wherein a distance BFL between the image-side surface of the sixth lens element to an image plane along the optical axis, and an air gap G56 between said fifth lens element and said sixth lens element along said optical axis satisfy a relationship $2 \leq BFL/G56 \leq 11.0$.

4. The optical imaging lens set of claim 3, wherein the effective focal length EFL of the optical imaging lens set satisfies a relationship $10.5 \leq EFL/G23 \leq 30$.

5. The optical imaging lens set of claim 1, wherein an air gap G12 between said first lens element and said second lens element along said optical axis further satisfies a relationship $AAG/G12 \leq 9$.

6. The optical imaging lens set of claim 5, wherein a distance BFL between the image-side surface of the sixth lens element to an image plane along the optical axis, and a thickness T5 of said fifth lens element along said optical axis satisfy a relationship $1.9 \leq BFL/T5 \leq 4.0$.

7. The optical imaging lens set of claim 1, wherein a thickness T5 of said fifth lens element along said optical axis further satisfies a relationship $T5/T6 \leq 1.22$.

8. The optical imaging lens set of claim 7, wherein a thickness T1 of said first lens element along said optical axis, and an air gap G12 between said first lens element and said second lens element along said optical axis satisfy a relationship $T1/G12 \leq 3$.

9. The optical imaging lens set of claim 7, wherein an air gap G56 between said fifth lens element and said sixth lens element along said optical axis, and an air gap G12 between said first lens element and said second lens element along said optical axis satisfy a relationship G56/G12≤4.

10. The optical imaging lens set of claim 9, wherein a thickness T3 of said third lens element along said optical axis, and a thickness T4 of said fourth lens element along said optical axis satisfy a relationship 1.1≤T3/T4≤3.0.

11. The optical imaging lens set of claim 1, wherein a total thickness ALT of said first lens element, said second lens element, said third lens element, said fourth lens element, said fifth lens element and said sixth lens element along said optical axis further satisfies a relationship ALT/T6≤6.

12. The optical imaging lens set of claim 11, wherein an air gap G12 between said first lens element and said second lens element along said optical axis satisfies a relationship G23/G12≤5.5.

13. The optical imaging lens set of claim 12, wherein a thickness T3 of said third lens element along said optical axis, and a thickness T5 of said fifth lens element along said optical axis satisfy a relationship 0.85≤T3/T5≤2.0.

14. The optical imaging lens set of claim 11, wherein a distance BFL between the image-side surface of the sixth lens element to an image plane along the optical axis satisfies a relationship 2.6≤BFL/G23≤10.

15. The optical imaging lens set of claim 1, wherein an air gap G12 between said first lens element and said second lens element along said optical axis further satisfies a relationship AAG/G12≤7.

16. The optical imaging lens set of claim 15, wherein the effective focal length EFL of the optical imaging lens set, and a thickness T5 of said fifth lens element along said optical axis satisfy a relationship 1.9≤EFL/T5≤14.0.

17. The optical imaging lens set of claim 1, wherein a total thickness ALT of said first lens element, said second lens element, said third lens element, said fourth lens element, said fifth lens element and said sixth lens element along said optical axis, and an air gap G12 between said first lens element and said second lens element along said optical axis satisfy a relationship ALT/G12≤13.6.

18. An electronic device, comprising:
   a case; and
   an image module disposed in said case and comprising:
      an optical imaging lens set of claim 1;
      a barrel for an installation of said optical imaging lens set;
      a module housing unit for an installation of said barrel;
      a substrate for an installation of said module housing unit; and
      an image sensor disposed on the substrate and disposed at an image side of said optical imaging lens set.

* * * * *